(12) United States Patent
Depraete et al.

(10) Patent No.: US 10,094,459 B2
(45) Date of Patent: Oct. 9, 2018

(54) TORQUE-COUPLING DEVICE WITH TORSIONAL VIBRATION DAMPER AND ONE-WAY TURBINE CLUTCH, AND METHOD FOR MAKING THE SAME

(71) Applicant: VALEO EMBRAYAGES, Amiens (FR)

(72) Inventors: Alexandre Depraete, Bloomfield, MI (US); Subramanian Jeyabalan, Troy, MI (US)

(73) Assignee: Valeo Embrayages, Amiens (FR)

( * ) Notice: Subject to any disclaimer, the term of this patent is extended or adjusted under 35 U.S.C. 154(b) by 0 days.

(21) Appl. No.: 15/387,073

(22) Filed: Dec. 21, 2016

(65) Prior Publication Data

US 2018/0172129 A1   Jun. 21, 2018

(51) Int. Cl.
| | | |
|---|---|---|
| F16H 45/02 | (2006.01) | |
| F16H 41/28 | (2006.01) | |
| F16D 47/04 | (2006.01) | |
| F16D 13/40 | (2006.01) | |
| F16D 41/06 | (2006.01) | |
| F16F 15/123 | (2006.01) | |
| F16H 41/24 | (2006.01) | |

(52) U.S. Cl.
CPC ............ *F16H 45/02* (2013.01); *F16D 13/40* (2013.01); *F16D 41/06* (2013.01); *F16D 47/04* (2013.01); *F16F 15/123* (2013.01); *F16H 41/28* (2013.01); *F16H 2041/246* (2013.01); *F16H 2045/0221* (2013.01); *F16H 2045/0278* (2013.01)

(58) Field of Classification Search
None
See application file for complete search history.

(56) References Cited

U.S. PATENT DOCUMENTS

| 1,724,983 A | 8/1929 | Weiss |
|---|---|---|
| 3,282,129 A | 11/1966 | Gabriel |
| (Continued) | | |

FOREIGN PATENT DOCUMENTS

| JP | 2003220842 A | 8/2003 |
|---|---|---|
| JP | 3570553 B2 | 9/2004 |
| (Continued) | | |

*Primary Examiner* — Jacob S. Scott
(74) *Attorney, Agent, or Firm* — Berenato & White, LLC

(57) ABSTRACT

A hydrokinetic torque converter comprises a casing, an impeller wheel, a turbine wheel coaxially aligned with the impeller wheel, a stator situated between the impeller and turbine wheels, a one-way turbine clutch permitting rotational movement of the turbine wheel in one circumferential direction only, and a torsional vibration damper. The one-way turbine clutch includes an outer ring non-rotatably coupled to the turbine wheel, an inner ring and engagement components positioned between the outer and the inner rings. The torsional vibration damper comprises an input member, circumferentially acting elastic members, and an output member elastically coupled to the input member through the elastic members. The output member of the torsional vibration damper is non-rotatably coupled to the outer ring of the one-way turbine clutch. The turbine wheel is non-rotatably coupled to one of the outer ring of the one-way turbine clutch and the output member of the torsional vibration damper.

19 Claims, 26 Drawing Sheets

(56) References Cited

U.S. PATENT DOCUMENTS

| | | | |
|---|---|---|---|
| 4,018,106 A * | 4/1977 | Uozumi | F16H 3/663 |
| | | | 475/47 |
| 4,592,250 A | 6/1986 | Plasencia et al. | |
| 4,608,883 A | 9/1986 | Bopp | |
| 4,703,840 A | 11/1987 | Bopp | |
| 4,889,012 A | 12/1989 | Dull | |
| 2007/0251789 A1 * | 11/2007 | Heck | F16H 41/24 |
| | | | 192/3.21 |
| 2010/0072014 A1 | 3/2010 | Heeke et al. | |
| 2013/0086798 A1 | 4/2013 | Frait et al. | |
| 2013/0205948 A1 | 8/2013 | Meier-Burkamp et al. | |
| 2014/0251744 A1 | 9/2014 | Steinberger et al. | |
| 2016/0084363 A1 | 3/2016 | Steinberger et al. | |
| 2017/0328455 A1 * | 11/2017 | Li | F16D 13/40 |

FOREIGN PATENT DOCUMENTS

| | | |
|---|---|---|
| JP | 3791481 B2 | 6/2006 |
| JP | 2011131619 A | 7/2011 |
| WO | WO2013020682 A1 | 2/2013 |

\* cited by examiner

TORQUE-COUPLING DEVICE WITH TORSIONAL VIBRATION DAMPER AND ONE-WAY TURBINE CLUTCH, AND METHOD FOR MAKING THE SAME

BACKGROUND OF THE INVENTION

1. Field of the Invention

The present invention generally relates to fluid coupling devices, and more particularly to a torque converter for hybrid vehicles having a one-way clutch for a turbine wheel, and a method for making the same.

2. Background of the Invention

Currently, the demand for "clean" vehicles has a tendency to increase as a result of the need to reduce fuel consumption and limit pollution. In general, hybrid systems are being developed for the purpose of achieving the aforementioned needs. Hybrid vehicles are known, for example, for having a torque converter and recuperative braking, wherein an alternator (or generator) is used to collect kinetic energy during braking of the vehicle. The alternator converts this collected kinetic energy into electrical energy, in order to charge an energy storage device in the form for example of a pack of super-capacitors or a battery. This energy, which is recuperated, is then returned to the various items of electrical and electronic equipment, which the motor vehicle includes. The electrical energy can also be used to start the thermal engine, or to assist the torque of the thermal engine.

In some operating conditions of a hybrid vehicle, such as in coasting mode, engine braking mode and regeneration mode, the output hub of a torque converter may rotate faster than the turbine wheel of the torque converter. Typically, the output hub and turbine wheel are non-rotationally connected. Thus, in the coasting, engine braking or regeneration modes, the rotation of the turbine wheel reverses the typical fluid flow patterns in the converter and the turbine "pumps" fluid to the impeller wheel. Such operation of the turbine wheel is undesirable because the rotation of the turbine wheel heats the oil in the torque converter, resulting in excessive heat losses, and in some cases even damage to the torque converter.

Moreover, during coasting of a hybrid vehicle, drag caused by the turbine wheel of a torque converter decreases efficiency of an electric motor of the hybrid vehicle as the drag creates a reverse torque and reduces the effective torque of the electric motor.

Also, in some operating conditions, such as regeneration mode in a hybrid vehicle, it is desirable to prevent rotation of the internal combustion engine. Furthermore, rotation of the turbine wheel can transfer some torque to the impeller wheel, and then to the internal combustion engine. It is known to use mechanical devices, such as one-way clutches or gear mechanisms, to disconnect an input shaft from the torque associated with the regeneration mode.

While conventional hydrokinetic torque-coupling devices, including but not limited to those discussed above, have proven to be acceptable for application in hybrid vehicles, improvements in one-way clutches allowing a turbine wheel of torque converters, used with hybrid vehicles, to be disconnected from a transmission input shaft during a regeneration mode, that may enhance their performance and cost, are possible.

BRIEF SUMMARY OF THE INVENTION

According to a first aspect of the invention, there is provided a hydrokinetic torque converter for coupling together a driving shaft and a driven shaft. The torque converter comprises a casing rotatable about a rotational axis, an impeller wheel rotatable around the rotational axis, a turbine wheel rotatable around the rotational axis and coaxially aligned with and hydro-dynamically rotationally drivable by the impeller wheel, a stator situated axially between the impeller wheel and the turbine wheel, a one-way turbine clutch permitting rotational movement of the turbine wheel in one circumferential direction only, and a torsional vibration damper. The one-way turbine clutch includes an outer ring non-rotatably coupled to the turbine wheel, an inner ring disposed radially within the outer ring, and a plurality of engagement components positioned radially between the outer and the inner rings and configured to permit rotational movement of the outer ring relative to the inner ring in one circumferential direction only. The torsional vibration damper comprises an input member rotatable about the rotational axis, a plurality of circumferentially acting elastic members, and an output member elastically coupled to the input member through the elastic members. The output member of the torsional vibration damper is non-rotatably coupled to the outer ring of the one-way turbine clutch. The turbine wheel is non-rotatably coupled to one of the outer ring of the one-way turbine clutch and the output member of the torsional vibration damper.

According to a second aspect of the present invention, there is provided a method for assembling a hydrokinetic torque converter. The method involves the steps of providing first and second casing shells of a casing rotatable about a rotational axis, providing a preassembled torque converter comprising an impeller wheel, a turbine wheel disposed axially opposite to the impeller wheel and a stator, the turbine wheel including a turbine shell, providing a one-way turbine clutch permitting rotational movement of the turbine wheel in one circumferential direction only, and providing a torsional vibration damper comprising an input member rotatable about the rotational axis, a plurality of circumferentially acting elastic members and an output member elastically coupled to the input member trough the elastic members. The one-way turbine clutch includes an outer ring, an inner ring disposed radially within the outer ring and a plurality of engagement components positioned radially between the outer and inner rings and configured to permitting rotational movement of the outer ring relative to the inner ring in one circumferential direction only. The method further comprises the steps of non-rotatably connecting the turbine wheel to one of the outer ring of the one-way turbine clutch coaxially with the rotational axis and the output member of the torsional vibration damper, non-rotatably attaching the output member of the torsional vibration damper to the outer ring of the one-way turbine clutch, and elastically mounting the input member of the torsional vibration damper to the output member of the torsional vibration damper through the circumferentially acting elastic members.

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

Figure 1:
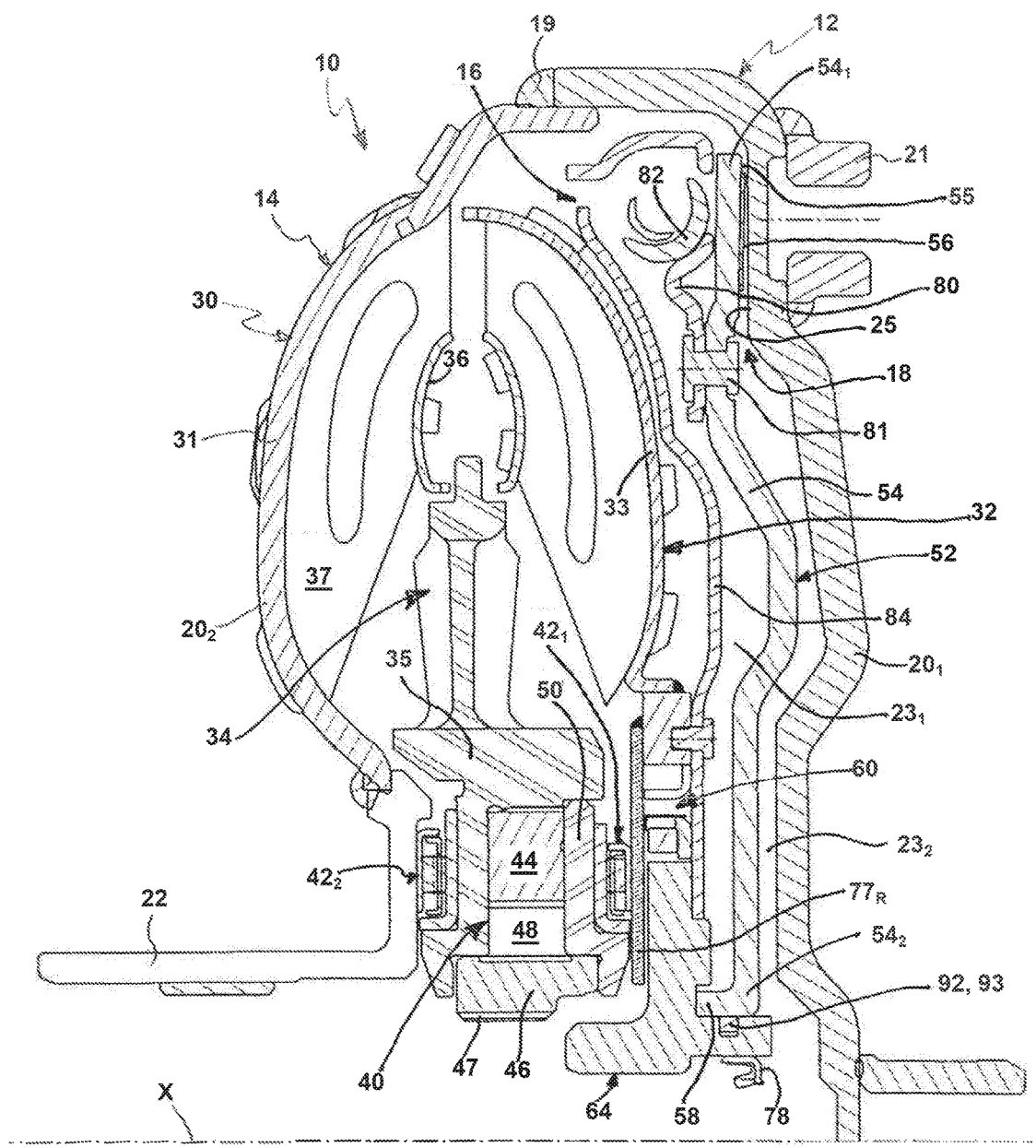
FIG. 1 is a fragmented half-view in axial section of a hydrokinetic torque converter in accordance with a first exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper," "lower," "right," "left," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims mean "at least one."

A first exemplary embodiment of a hydrokinetic torque converter, such as to be used in hybrid vehicles, is generally represented in the accompanying drawings by reference numeral 10, as best shown in the fragmentary sectional views in FIGS. 1-4. The hydrokinetic torque converter 10 is operable in known manner to fluidly couple a driving shaft and a driven shaft of a motor vehicle, such as an automobile. In the typical case, the driving shaft is an output shaft of an internal combustion engine (not shown) of the motor vehicle and the driven shaft is connected to an automatic transmission of the motor vehicle.

The hydrokinetic torque converter 10 comprises a sealed casing 12 rotatable about a rotational axis X, a fluid coupling 14, a torsional vibration damper (also referred to herein as a damper assembly) 16 and a friction lock-up clutch 18 also rotatable about the rotational axis X, and all disposed in the casing 12. The sealed casing 12 is at least partially filled with a fluid, such as oil or transmission fluid. The torsional vibration damper 16 and the friction lock-up clutch 18 are also disposed in the casing 12. The drawings discussed herein show half-views, that is, the portion or fragment of the hydrokinetic torque converter 10 above the rotational axis X. Generally, the torque converter 10 is symmetrical about the rotational axis X. Herein, the axial and radial orientations are considered with respect to the rotational axis X of the torque converter 10. The relative terms such as "axially," "radially," and "circumferentially" are with respect to orientations parallel to, perpendicular to, and circularly around the rotational axis X, respectively.

The sealed casing 12, according to the first exemplary embodiment as illustrated in FIG. 1, includes a first casing shell (or cover shell) $20_1$ and a second casing shell (or impeller shell) $20_2$ non-movably (i.e., fixedly) interconnected sealingly together, such as by welding at weld 19, at their outer peripheries, yet rotatable about the rotational axis X. The first casing shell $20_1$ is non-movably (i.e., fixedly) interconnected to the driving shaft, more typically to a flywheel (not shown) that is fixed so as to be non-rotatable relative to the driving shaft, so that the casing 12 turns at the same speed that the engine operates for transmitting torque. Specifically, in the illustrated embodiment of FIG. 1 the casing 12 is rotatably driven by the internal combustion engine and is non-rotatably coupled to the flywheel with studs 21. Typically, the studs 21 are fixedly secured, such as by welding, to the cover shell $20_1$. Each of the first and second casing shells $20_1$, $20_2$ are integral (i.e., unitary) or one-piece, and may be made, for example, integrally by press-forming one-piece metal sheets. The first casing shell $20_1$ defines a substantially radial locking surface 25 facing the fluid coupling 14 and the damper assembly 16 within the casing 12, best shown in FIG. 1.

The fluid coupling 14 includes an impeller wheel (sometimes referred to as the pump) 30, a turbine wheel 32, and a stator (sometimes referred to as the reactor) 34 interposed axially between the impeller wheel 30 and the turbine wheel 32. The impeller wheel 30, the turbine wheel 32 and the stator 34 are coaxially aligned with one another on the rotational axis X. The impeller wheel 30, the turbine wheel 32 and the stator 34 collectively form a torus. The impeller wheel 30 and the turbine wheel 32 may be fluidly (or hydro-dynamically) coupled to one another as known in the art.

The impeller wheel 30 includes a substantially annular, semi-toroidal (or concave) impeller shell 31, a substantially annular impeller core ring 36, and a plurality of impeller blades 37 fixedly (i.e., non-moveably) attached, such as by brazing, to the impeller shell 31 and the impeller core ring 36. At least a portion of the second casing shell $20_2$ of the casing 12 forms and serves as the impeller shell 31 of the impeller assembly 30. Accordingly, the impeller shell 31 sometimes is referred to as a portion of the casing 12. As a result, the impeller shell 31 of the impeller wheel 30 is non-rotatable relative to the first casing shell $20_1$ and hence to the drive shaft (or flywheel) of the engine to rotate at the same speed as the engine output. The impeller wheel 30 also includes an impeller hub 22 fixedly secured to the second casing shell $20_2$ (or impeller shell 31). The impeller hub 22 is arranged for engagement with a hydraulic pump of the transmission. The impeller shell 31, impeller core ring 36 and the impeller blades 37 are conventionally formed by stamping from steel blanks.

The turbine wheel 32 includes a substantially toroidal turbine shell 33, a substantially annular turbine core ring 38, and a plurality of turbine blades 39 fixedly (i.e., non-moveably) attached, such as by brazing, to the turbine shell 33 and the core ring 38. The rotation of the impeller wheel 30 causes transmission fluid in the torus to rotate the turbine blades 36, and hence the turbine shell 33. The turbine shell 33, the turbine core ring 30 and the turbine blades 31 are conventionally formed by stamping from steel blanks.

The stator 34 is positioned between the impeller wheel 30 and turbine wheel 32 to redirect fluid from the turbine wheel 32 back to the impeller wheel 30 in an efficient manner. The stator 34 is typically mounted on a one-way stator clutch 40 to prevent the stator 34 from counter-rotation. A first thrust bearing $42_1$ is interposed between the stator 34 and the turbine shell 33, while a second thrust bearing $42_2$ is interposed between the stator 34 and the impeller hub 22 or the second casing shell $20_2$ of the casing 12.

The one-way stator clutch 40, as best shown in FIG. 1, is mounted within a stator hub 35 of the stator 34 and includes an outer ring 44 coaxial with the rotational axis X, an inner ring 46 coaxial to rotational axis X, and a plurality of sprags or cylindrical rollers 48 circumferentially disposed in an annular space defined between the outer ring 44 and the inner ring 46. An inner peripheral surface of the inner ring 46 has splines 47 for rotatably coupling to an outer periphery of a stator shaft.

The stator 34 includes an annular stator retainer plate 50 provided to retain the one-way stator clutch 40 within the stator hub 35 and to prevent axial movement of components of the one-way stator clutch 40 in the direction of the rotational axis X relative to the stator hub 35. The stator retainer plate 50 has an axially inner end face engaging both the outer ring 44 and the inner ring 46 of the one-way stator clutch 40 to retain the sprags or cylindrical rollers 48 within the stator hub 35. An axially outer end face of the stator retainer plate 50 engages the first thrust bearing $42_1$. According to the first exemplary embodiment, the stator retainer plate 50 is secured to the stator hub 35 of the stator 34.

The lock-up clutch 18 includes a substantially annular locking piston 52 axially displaceable along the rotational axis X toward (an engaged position (or lockup mode) of the lock-up clutch 18) and away (a disengaged position (or non-lockup) of the lock-up clutch 18) from the locking surface 25 inside the cover shell $20_1$ of the casing 12. In other words, the locking piston 52 is selectively pressed against the locking surface 25 of the casing 12 so as to lock-up the torque converter 10 between the shafts and thus control sliding movement between the turbine wheel 32 and the impeller wheel 30.

The locking piston 52 includes a substantially annular piston body 54, and an annular friction liner 56 fixedly attached to the piston body 54 so as to face the locking surface 25 of the casing 12. The piston body 54 has an engagement surface 55 axially facing the locking surface 25 of the casing 12. As best shown in FIG. 1, the annular friction liner 56 is fixedly attached to the engagement surface 55 of the piston body 54 at a radially outer peripheral end $54_1$ thereof by any appropriate means known in the art, such as by adhesive bonding, as best shown in FIG. 1. Extending axially at a radially inner peripheral end $54_2$ of the piston body 54 is a substantially cylindrical flange 58 that is proximate to and coaxial with the rotational axis X.

The annular friction liner 56 is made of a friction material for improved frictional performance. Alternatively, an annular friction liner may be secured to the locking surface 25 of the casing 12. According to still another embodiment, a first friction ring or liner is secured to the locking surface 25 of the casing 12 and a second friction ring or liner is secured to the engagement surface 55 of the locking piston body 54. It is within the scope of the invention to omit one or both of the friction rings. In other words, the annular friction liner 56 may be secured to any, all, or none of the engagement surfaces. Further according to the exemplary embodiment, the engagement surface 55 of the locking piston body 54 is slightly conical to improve the engagement of the lock-up clutch 18. Specifically, the engagement surface 55 of the locking piston body 54 holding the annular friction liner 55 is conical, at an angle between 60° and 80° to the axis X, to improve the torque capacity of the lock-up clutch 18. Alternatively, the engagement surface 55 of the locking piston body 54 may be parallel to the locking surface 25 of the casing 12.

Figure 3:
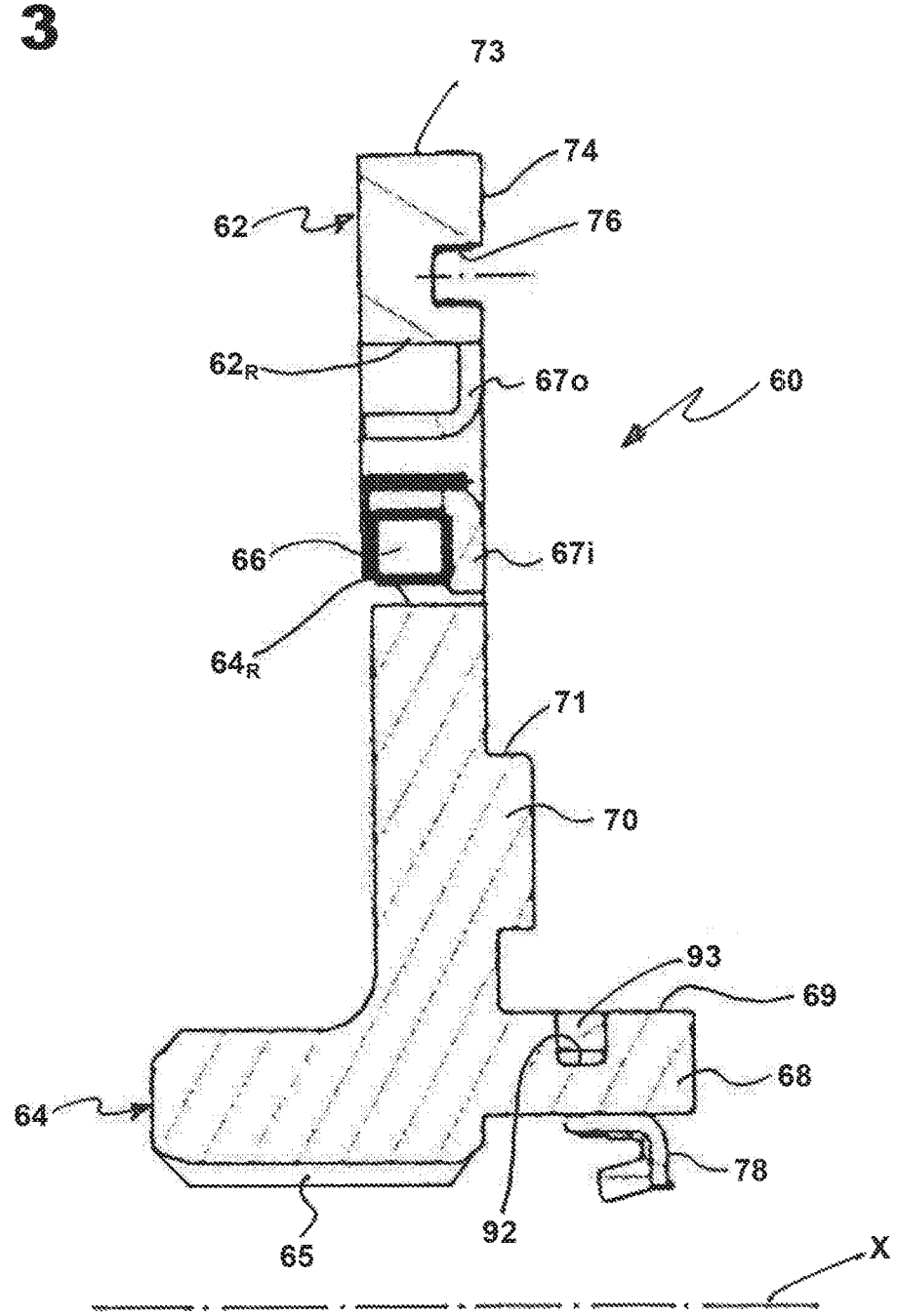
FIG. 3 is a cross-sectional half-view of the one-way turbine clutch of FIG. 2.

The hydrokinetic torque converter 10 further comprises a one-way turbine clutch 60 to prevent the turbine wheel 32 from counter-rotation. In other words, the one-way turbine clutch 60 permits rotational movement of the turbine wheel 32 in one circumferential direction only. The one-way turbine clutch 60, as best shown in FIG. 3, includes an outer ring 62 coaxial with the rotational axis X, an inner ring 64 coaxial with the outer ring 62 and radially spaced from the outer ring 62 to allow relative rotation of the outer and inner rings 62 and 64, respectively, and a plurality of engagement components 66 circumferentially disposed in an annular space defined between the outer ring 62 and the inner ring 64. The outer ring 62 has an annular radially outer racetrack surface $62_R$ and the inner ring 64 has an annular radially inner racetrack surface $64_R$ facing and spaced radially apart from the radially outer race surface $62_R$. As best shown in FIG. 3, the radially inner racetrack surface $64_R$ of the inner ring 64 is disposed radially inside the radially outer racetrack surface $62_R$ of the outer ring 62. The engagement components 66 are configured to engage the radially opposite outer racetrack surface $62_R$ and the inner racetrack surface $64_R$.

The engagement components 66 are configured to selectively non-rotatably engage the outer ring 62 with the inner ring 64 and to selectively rotatably disengage the outer ring 62 from the inner ring 64. According to the exemplary embodiment of the present invention, the engagement components 66 are sprag elements distributed in the circumferential direction. The sprag-type one-way turbine clutch 60 further includes an outer side cage 67o for retaining the sprags 66 on an outer peripheral side of the annular space, an inner side cage 67i for retaining the sprags 66 on an inner peripheral side of the annular space, and a ribbon spring, as best shown in FIG. 3. The ribbon spring is an annular spring member configured for biasing the sprags 66 radially between the outer ring 62 and the inner ring 64 by elastic force thereof. Radially outer ends of the sprags 66 are configured to engage the radially outer racetrack surface $62_R$ of the outer ring 62, while radially inner ends of the sprags 66 are configured to engage the radially inner racetrack surface $64_R$ of the inner ring 64 of the one-way turbine clutch 60. Alternatively, the engagement components may be rollers or wedge elements.

In other words, the outer ring 62 is rotatable relative to the inner ring 64 of the one-way turbine clutch 60 in one circumferential direction only. An inner peripheral surface of the inner ring 64 has splines 65 for rotatably coupling to an outer periphery of a transmission input shaft. Accordingly, the inner ring 64 of the one-way turbine clutch 60 defines an output hub of the hydrokinetic torque converter 10. As further illustrated in FIG. 1, the cylindrical flange 58 of the piston body 54 is axially slidingly mounted to the output hub 64. Accordingly, the locking piston 52 is rotatable and axially movable relative to the output hub 64 along the rotational axis X respectively into and out of lock-up mode. A sealing member 78, mounted to a radially inner peripheral surface of the output hub 64, creates a seal at the interface of a transmission input shaft and the output hub 64. Moreover, the turbine wheel 32 is rotatable relative to the output hub 64 around the rotational axis X.

Figure 4:
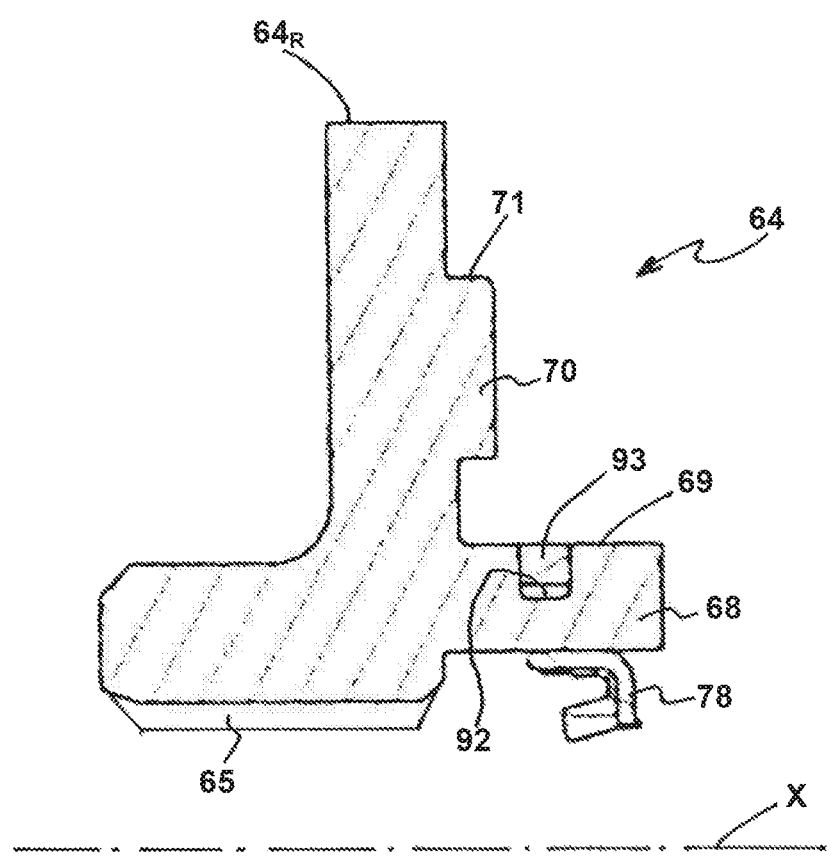
FIG. 4 is a cross-sectional half-view of an inner ring of the one-way turbine clutch of FIG. 3.
Figure 5A:
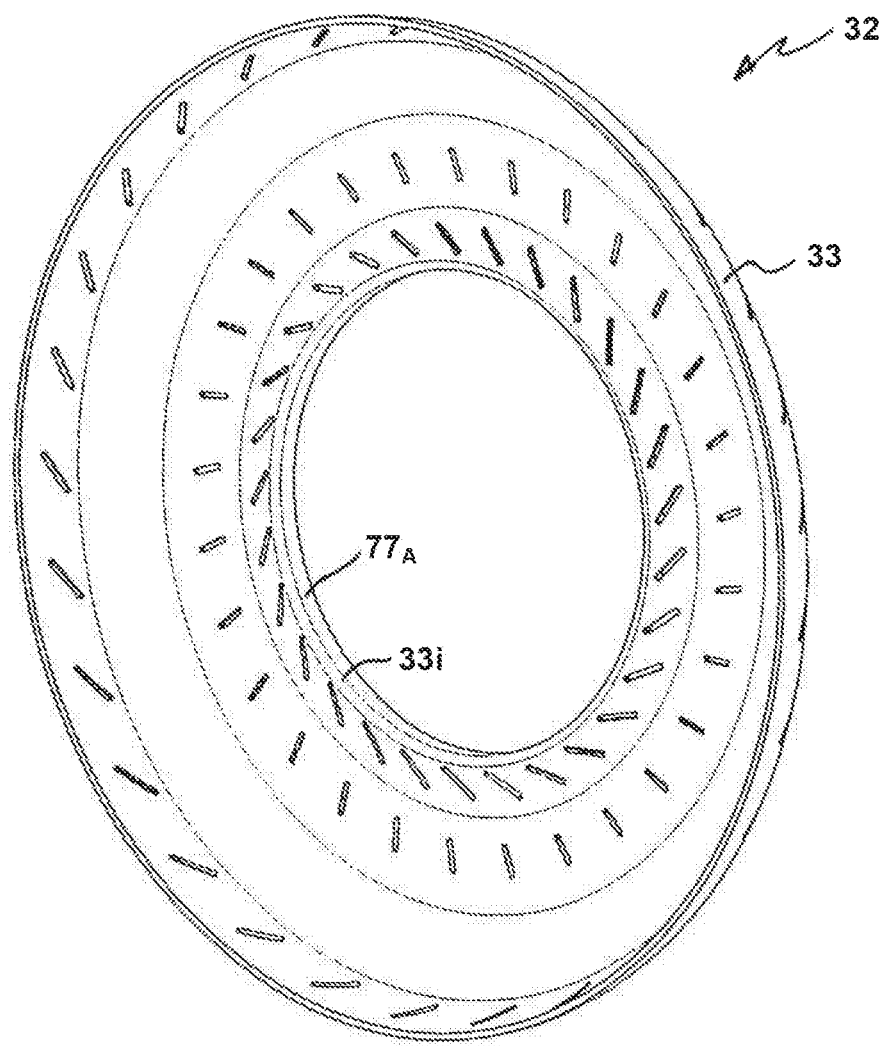
FIG. 5A is a partial front perspective view of the turbine wheel of the hydrokinetic torque converter in accordance with the first exemplary embodiment of the present invention.
Figure 5B:
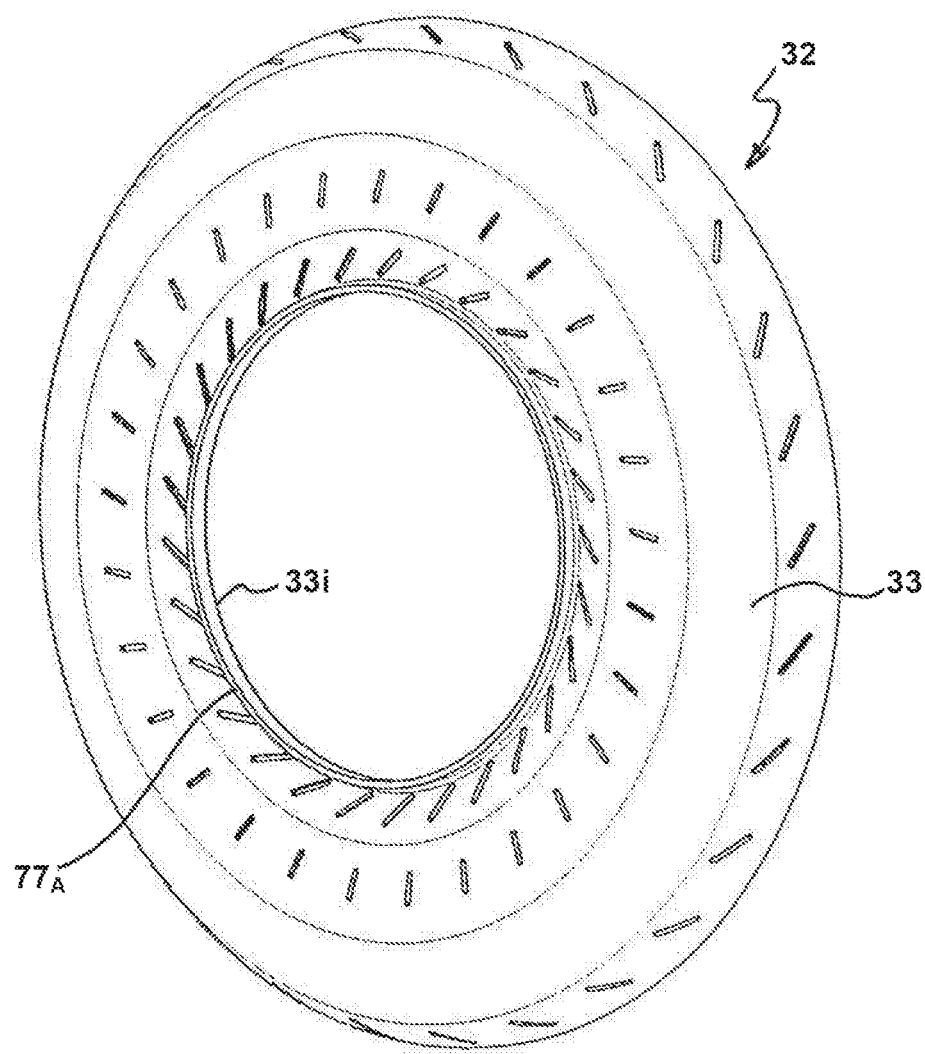
FIG. 5B is a partial rear perspective view of the turbine wheel of the hydrokinetic torque converter in accordance with the first exemplary embodiment of the present invention.
Figure 6:
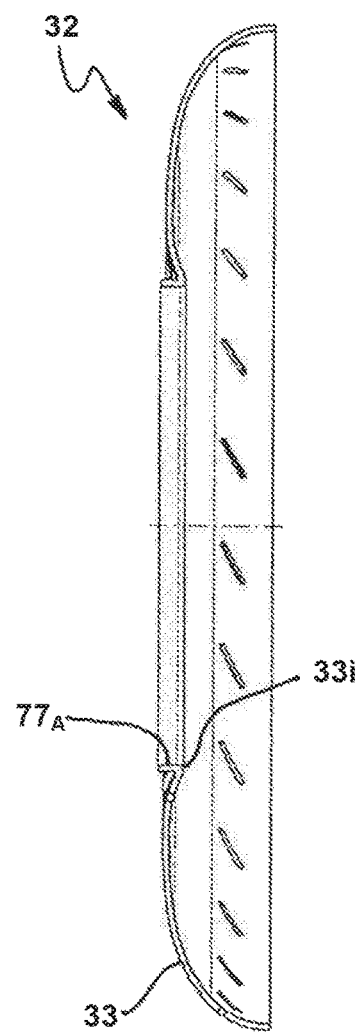
FIG. 6 is a partial cross-sectional view of the turbine wheel of FIG. 5B.
Figure 7:
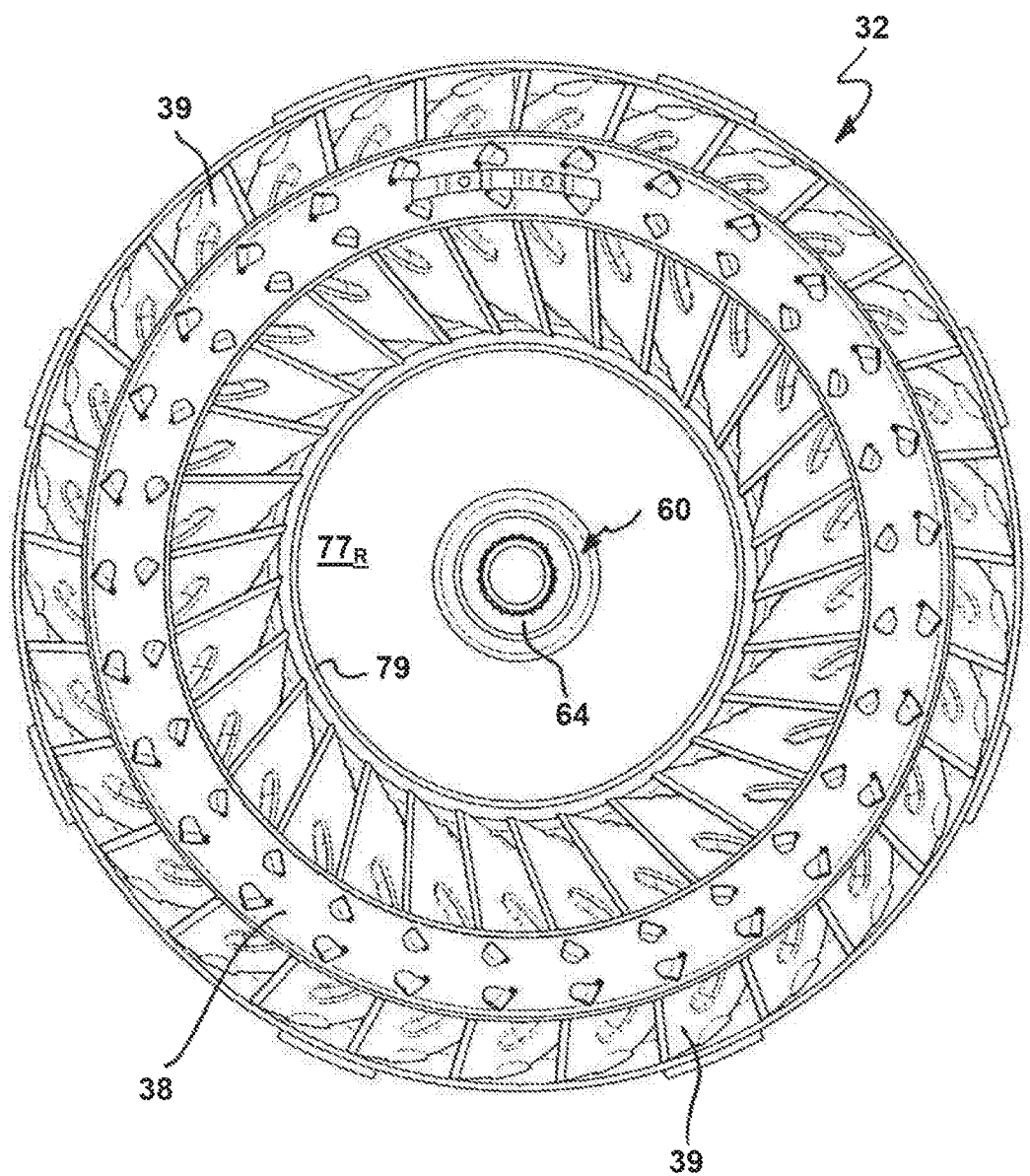
FIG. 7 is a front plan view of the turbine wheel of the hydrokinetic torque converter in accordance with the first exemplary embodiment of the present invention with the one-way turbine clutch mounted thereto.

The output hub 64 has an annular piston flange 68 extending axially outwardly from the output hub 64 and defining a substantially cylindrical piston surface 69 for centering the locking piston 52 and slidingly engaging the cylindrical flange 58 of the locking piston 52, as best shown in FIGS. 1-4. Specifically, the cylindrical flange 58 of the locking piston 52 is mounted to the output hub 64 so as to be centered, rotatable and axially slidably displaceable relative to the cylindrical piston surface 69 of the output hub 64. The output hub 64 also has an annular guide ledge 70 extending axially outwardly from the output hub 64 and defining an annular (such as cylindrical, for example) radially outer guide surface 71, as best shown in FIGS. 3 and 4.

The outer ring 62 of the one-way turbine clutch 60 has a substantially cylindrical radially outer surface 73, and a substantially annular planar (i.e., flat) side surface 74 extending substantially orthogonally to the rotational axis X and facing the locking piston 52. One or more threaded bores 76 are formed in the planar surface 74 of the outer ring 62 of the one-way turbine clutch 60, as best shown in FIG. 3.

In some operating conditions of a hybrid vehicle, such as in coasting mode, engine braking mode and regeneration mode, the output hub 64 for the torque converter 10 may rotate faster than the turbine wheel 32 of the torque converter 10. Accordingly, the one-way turbine clutch 60 prevents drag by the turbine wheel 32 and a reverse torque, which usually decreases efficiency of the electric motor of the hybrid vehicle, to avoid reduction of an effective torque of the electric motor of the hybrid vehicle. In other words, the one-way turbine clutch 60 decouples the turbine wheel 32 from the output hub 64 of the torque converter 10 in some operating conditions of the hybrid vehicle, such as in coasting mode, engine braking mode and regeneration mode.

The turbine wheel 32 further includes a substantially annular coupling member $77_A$ extending substantially axially outwardly from an radially inner end 33i of the toroidal turbine shell 33 in the direction toward the cover shell $20_1$, as best shown in FIGS. 2, 5A, 5B and 6. According to the first exemplary embodiment of the present invention, the turbine shell 33 with the coupling member $77_A$ is an integral (or unitary) component, e.g., made of a single part, but may be separate components fixedly connected together.

The turbine wheel 32 is non-moveably attached (i.e., fixed) to the outer ring 62 of the one-way turbine clutch 60. Specifically, as best shown in FIG. 2, the annular coupling member $77_A$ of the turbine wheel 32 is disposed on a radially outer surface 73 of the outer ring 62 and fixed to the outer ring 62 of the one-way turbine clutch 60, such as by welding at weld 61, at an axially distal, annular free end of the coupling member $77_A$ of the turbine wheel 32.

Figure 2:
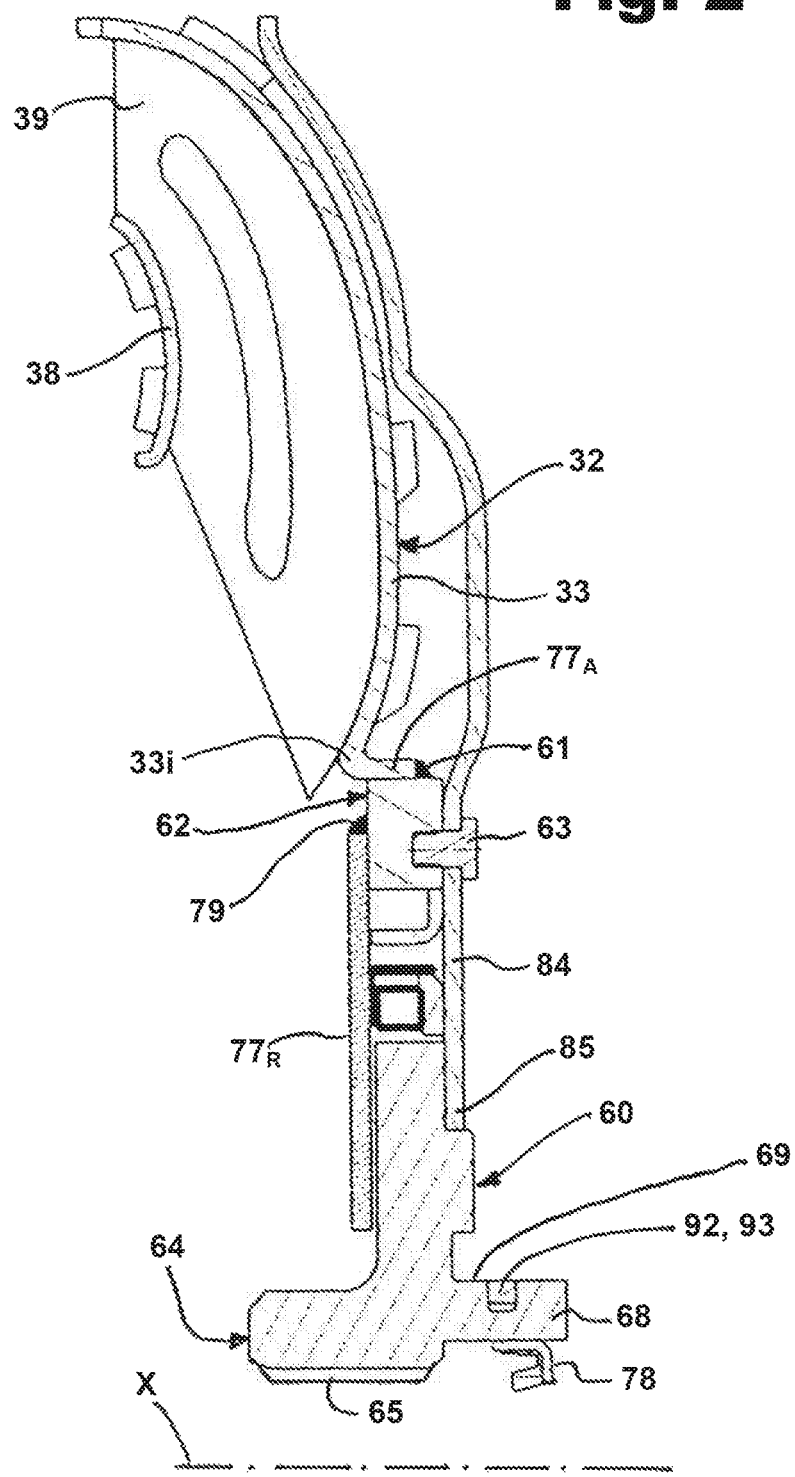
FIG. 2 is fragmented half-view in axial section of a turbine wheel and a one-way turbine clutch of the hydrokinetic torque converter in accordance with the first exemplary embodiment of the present invention.

The fluid coupling 14 further comprises a substantially annular retainer plate $77_R$ extending substantially radially between the outer ring 62 and the inner ring 64 of the one-way turbine clutch 60, as best shown in FIG. 2. The retainer plate $77_R$ is configured to cover the engagement components 66 and at least partially overlap the outer ring 62 and the inner ring 64 of the one-way turbine clutch 60. As illustrated in FIG. 1, the retainer plate $77_R$ is disposed axially between the first thrust bearing $42_1$ and the one-way turbine clutch 60. According to the first exemplary embodiment of the present invention, the retainer plate $77_R$ is formed separate from the turbine shell 33 with the coupling member $77_A$. Moreover, the retainer plate $77_R$ is non-movably (i.e., fixedly) attached to the outer ring 62 of the one-way turbine clutch 60 by appropriate means, such as by mechanical fasteners, adhesive bonding or be welding, such as by welds 79. The retainer plate $77_R$ is configured to retain the engagement components 66 between the outer ring 62 and the inner ring 64, and to prevent axial movement of the inner ring 64 and the engagement components 66 of the one-way turbine clutch 60 relative to the outer ring 62 along the rotational axis X in the direction from right to left as shown in FIG. 2.

The torsional vibration damper 16 is housed in the casing 12 axially between the turbine wheel 32 and the first casing shell $20_1$ of the casing 12, as best shown in FIG. 1. The torsional vibration damper 16 includes a substantially annular drive (or input) member 80, a plurality of circumferential elastic damping members 82 circumferentially equidistantly spaced from one another, and a substantially annular driven (or output) member 84. According to the first exemplary embodiment of FIG. 1, the elastic damping members 82 are configured as helical (or coil) springs having a principal axis oriented substantially circumferentially. Other elastic members may be selected to replace or supplement the springs 82. The drive member 80 and the driven member 84 engage circumferentially opposite ends of the elastic damping members 82. Accordingly, the drive member 80 is elastically coupled to the driven member 84 through the elastic damping members 82, as is well known in the art. Thus, the driven member 84 of the torsional vibration damper 16 is rotatable relative to the drive member 80 due to elasticity of the elastic damping members 82, which absorb torsional vibration. As best shown in FIG. 2, a radially inner (or distal) end 85 of the driven member 84 slidingly engages the radially outer guide surface 71 of the guide ledge 70 of the output hub 64 so as to center and radially support the driven member 84 of the torsional vibration damper 16.

According to the first exemplary embodiment, the drive member 80 of the torsional vibration damper 16 and the locking piston body 54 of the locking piston 52 are fixedly (i.e., non-moveably) connected together by rivets 81, as best shown in FIG. 1. In turn, the driven member 84 is non-rotatably connected to outer ring 62 of the one-way turbine clutch 60, such as by mechanical fasteners 63, or welding, or dowel pins, so as to be non-rotatable relative to the outer ring 62, as best shown in FIG. 2. Thus, the locking piston 52 is elastically coupled to the outer ring 62 through the torsional vibration damper 16. The mechanical fasteners 63 are inserted in the complementary threaded bores 76 formed in the side surface 74 of the outer ring 62 of the one-way turbine clutch 60. As a result, the driven member 84 of the torsional vibration damper 16 is configured to retain the engagement components 66 between the outer ring 62 and the inner ring 164, and to prevent axial movement of the second bearing washer 96, the inner ring 164 and the engagement components 66 of the one-way turbine clutch 160 relative to the outer ring 62 along the rotational axis X in the direction from left to right as shown in FIG. 2.

The lock-up clutch 18 selectively locks the driving and driven shafts. The lock-up clutch 18 is usually activated after starting of the motor vehicle and after hydraulic coupling of the driving and driven shafts, in order to avoid the loss of efficiency caused in particular by slip phenomena between the turbine wheel 30 and the impeller wheel 32. The locking piston 52 is axially displaceable toward (an engaged (or locked) position of the lock-up clutch 18) and away (a disengaged (or open) position of the lock-up clutch 18) from the locking surface 25 inside the casing 12. Moreover, the locking piston 52 is axially displaceable away from (the engaged (or locked) position of the lock-up clutch 18) and toward (the disengaged (or open) position of the lock-up clutch 18) the torsional vibration damper 16. Specifically, the cylindrical flange 58 of the locking piston body 54 is mounted to the cylindrical piston surface 69 of the annular piston flange 68 of the output hub 64 so as to be centered, rotatable and axially slidably displaceable relative to the output hub 64 and the cover shell $20_1$ of the casing 12. As discussed in further detail below, the locking piston 52 is axially movably relative to the cover shell $20_1$ along the rotational axis X. The axial motion of the locking piston 52 along the output hub 64 is controlled by torus and damper pressure chambers $23_1$, $23_2$ positioned on axially opposite sides of the locking piston 54, as best shown in FIG. 1.

The locking piston 54 is selectively pressed against the locking surface 25 of the casing 12 so as to lock-up the torque converter 10 between the driving shaft and the driven shaft and to thus control sliding movement between the turbine wheel 32 and the impeller wheel 30. Specifically, when appropriate hydraulic pressure in applied to the locking piston 52, the locking piston 52 moves rightward (as shown in FIG. 1) toward the locking surface 25 of the casing 12 and away from the turbine wheel 32, and clamps the friction liner 56 between the engagement surface 55 of the piston body 54 and the locking surface 25 of the casing 12. As a result, the lock-up clutch 18 in the locked position operatively couples the outer ring 62 of the one-way turbine clutch 60 to the casing 12 through the torsional vibration damper 16, so as to bypass the turbine wheel 32 when in the locked position of the lock-up clutch 18. Thus, the lock-up clutch 18 bypasses the turbine wheel 32 when in the locked position.

In operation, when the lock-up clutch 18 is in the disengaged (open) position and when the turbine wheel 32 rotates faster than the output hub 64, the engine torque is transmitted from the impeller wheel 30 by the turbine wheel 32 of the fluid coupling 14 to the output hub 64 through the one-way turbine clutch 60. When the lock-up clutch 18 is in the engaged (locked) position, the engine torque is transmitted by the casing 12 to the outer ring 62 of the one-way turbine clutch 60 through the torsional vibration damper 16. However, when the hybrid vehicle is in coasting mode, engine braking mode or regeneration mode, i.e., when the output hub 64 rotates faster than the turbine wheel 32, the one-way turbine clutch 60 decouples the turbine wheel 32 from the output hub 64 of the torque converter 10 and does not transmit torque from the output hub 64 to the turbine wheel 32.

A method for assembling the hydrokinetic torque converter 10 is as follows. It should be understood that this exemplary method may be practiced in connection with the other embodiments described herein. This exemplary method is not the exclusive method for assembling the turbine assembly described herein. While the methods for assembling the hydrokinetic torque converter 10 may be practiced by sequentially performing the steps as set forth below, it should be understood that the methods may involve performing the steps in different sequences.

First, the impeller wheel 30, the turbine wheel 32, the stator 34, and the torsional vibration damper 16 with the locking piston 52 may each be preassembled. The impeller wheel 30 and the turbine wheel 32 are formed by stamping from steel blanks or by injection molding of a polymeric material. The stator 34 is made by casting from aluminum or injection molding of a polymeric material. The impeller wheel 30, the turbine wheel 32 and the stator 34 subassemblies are assembled together so as to form the fluid coupling 14.

According to the exemplary embodiment of the present invention, the turbine wheel 32 is formed with the toroidal turbine shell 33, and the annular coupling member $77_A$ extending substantially axially outwardly from the radially inner end 33i of the toroidal turbine shell 33, as best shown in FIGS. 2, 5A, 5B and 6. According to the first exemplary embodiment of the present invention, the turbine shell 33 with the coupling member $77_A$ is an integral (or unitary) component, e.g., made of a single part, but may be separate components fixedly connected together.

The one-way turbine clutch 60 is then added. First, the annular retainer plate $77_R$ is provided. The annular retainer plate $77_R$ is non-movably attached (i.e., fixed) to the outer ring 62 of the one-way turbine clutch 60, such as by welding at weld 79, at a radially outer distal, annular free end of the annular retainer plate $77_R$. Then, the annular retainer plate $77_R$ is placed adjacent to a radially left side of the one-way turbine clutch 60 axially between the first thrust bearing $42_1$ and the one-way turbine clutch 60. Next, the he turbine wheel 32 is mounted to the one-way turbine clutch 60 so that the coupling member $77_A$ of the turbine wheel 32 is placed on the radially outer surface 73 of the outer ring 62 and is fixed to the outer ring 62 of the one-way turbine clutch 60, such as by welding at weld 61, at an axially distal, annular free end of the coupling member $77_A$ of the turbine wheel 32.

The torsional vibration damper 16 is then added. Before the torsional vibration damper 16 is assembled, the locking piston body 54 of the lo locking piston 52 is fixed to the input member 80 of the torsional vibration damper 16 by appropriate means, such as by welding, adhesive bonding or fasteners, such as the rivets 81.

Next, the output member 84 is non-rotatably connected to the outer ring 62 of the one-way turbine clutch 60, such as by mechanical fasteners 63, or welding, or dowel pins, so as to be non-rotatable relative to the outer ring 62, as shown in FIGS. 1 and 2. At the same time, the radially inner end 85 of the driven member 84 slidingly engages the radially outer guide surface 71 of the guide ledge 70 of the output hub 64. Then, the first casing shell $20_1$ is non-moveably and sealingly secured, such as by welding at 19, to the second casing shell $20_2$, as best shown in FIG. 1.

Various modifications, changes, and alterations may be practiced with the above-described embodiment, including but not limited to the additional embodiments shown in FIGS. 8-23. In the interest of brevity, reference characters in FIGS. 8-23 that are discussed above in connection with Figs. FIGS. 1-7 are not further elaborated upon below, except to the extent necessary or useful to explain the additional embodiments of FIGS. 88-23. Modified components and parts are indicated by the addition of a hundred digits to the reference numerals of the components or parts.

Figure 8:
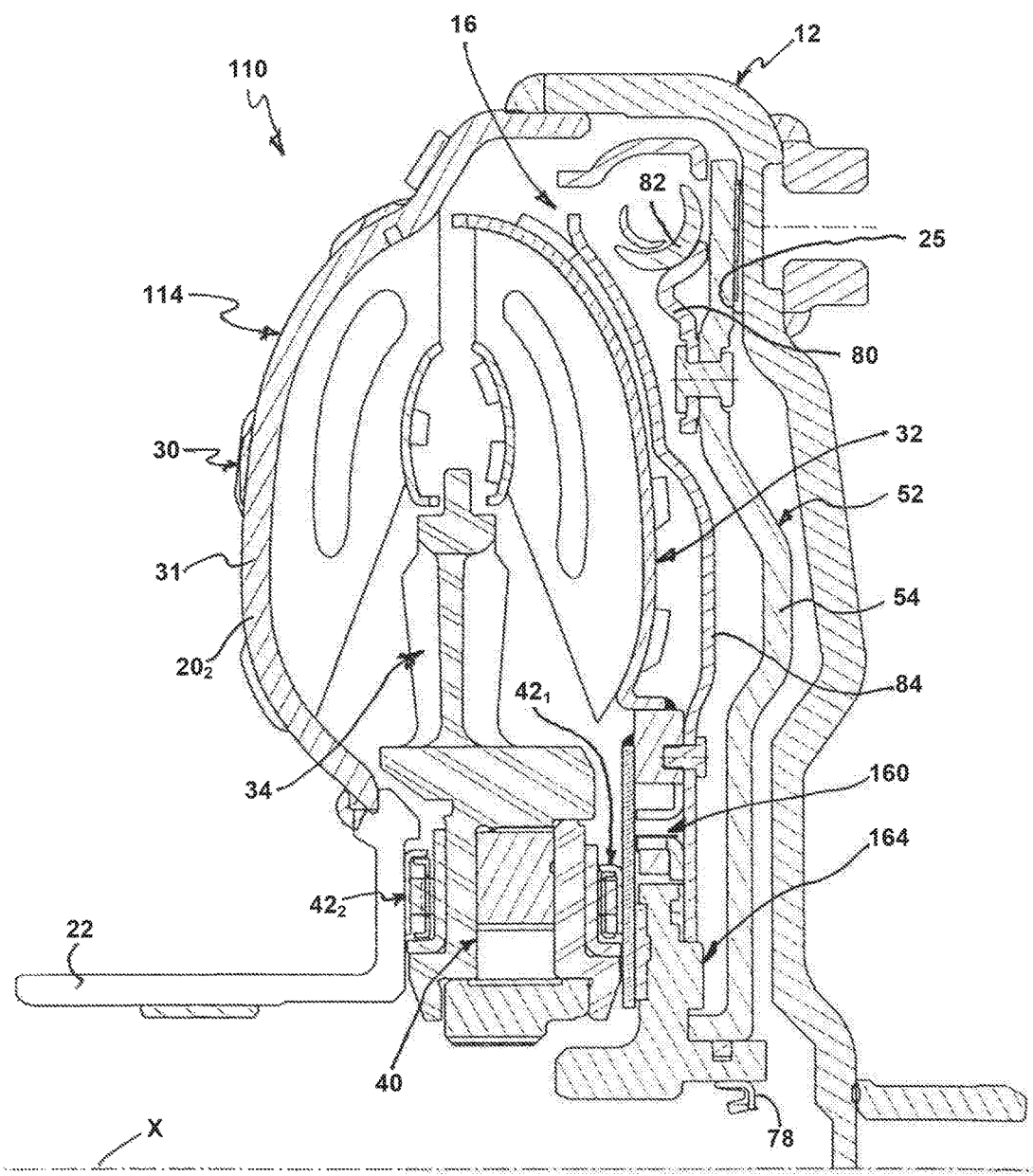
FIG. 8 is a fragmented half-view in axial section of a hydrokinetic torque converter in accordance with a second exemplary embodiment of the present invention.
Figure 9:
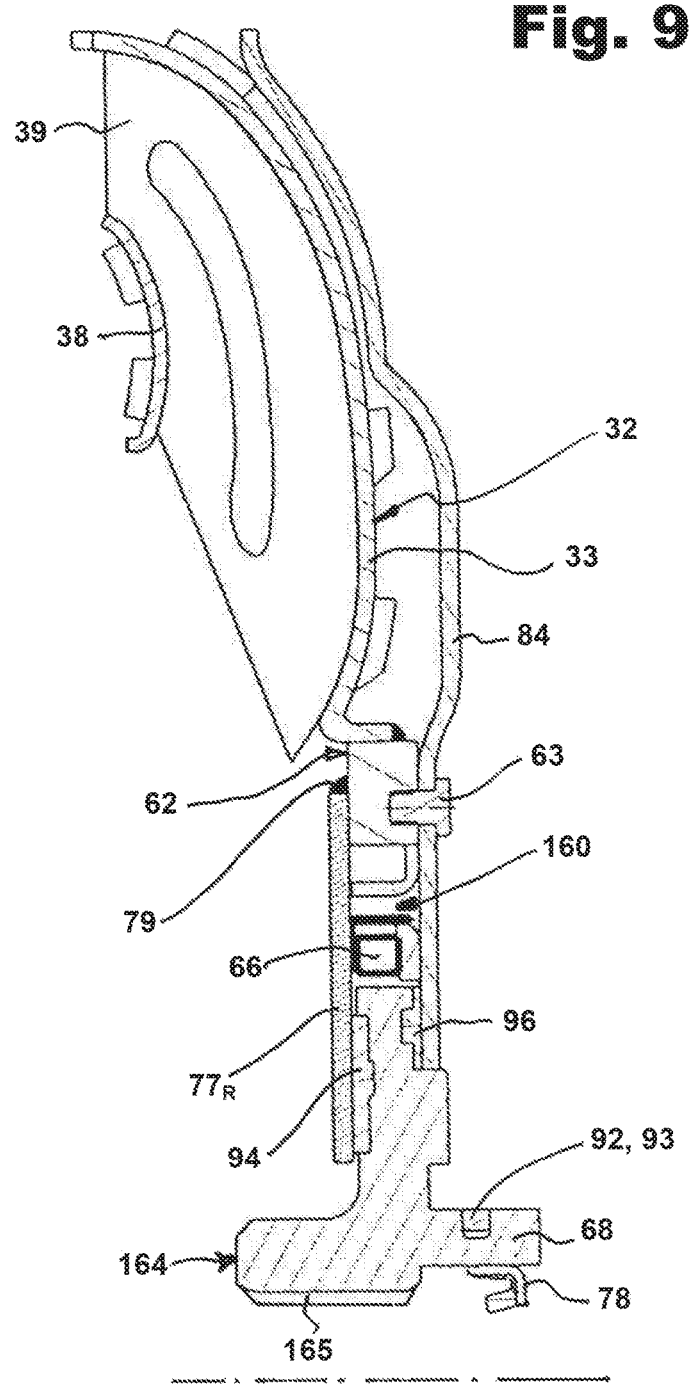
FIG. 9 is a fragmented half-view in axial section of a turbine wheel and a one-way turbine clutch of the hydrokinetic torque converter in accordance with the second exemplary embodiment of the present invention.
Figure 10:
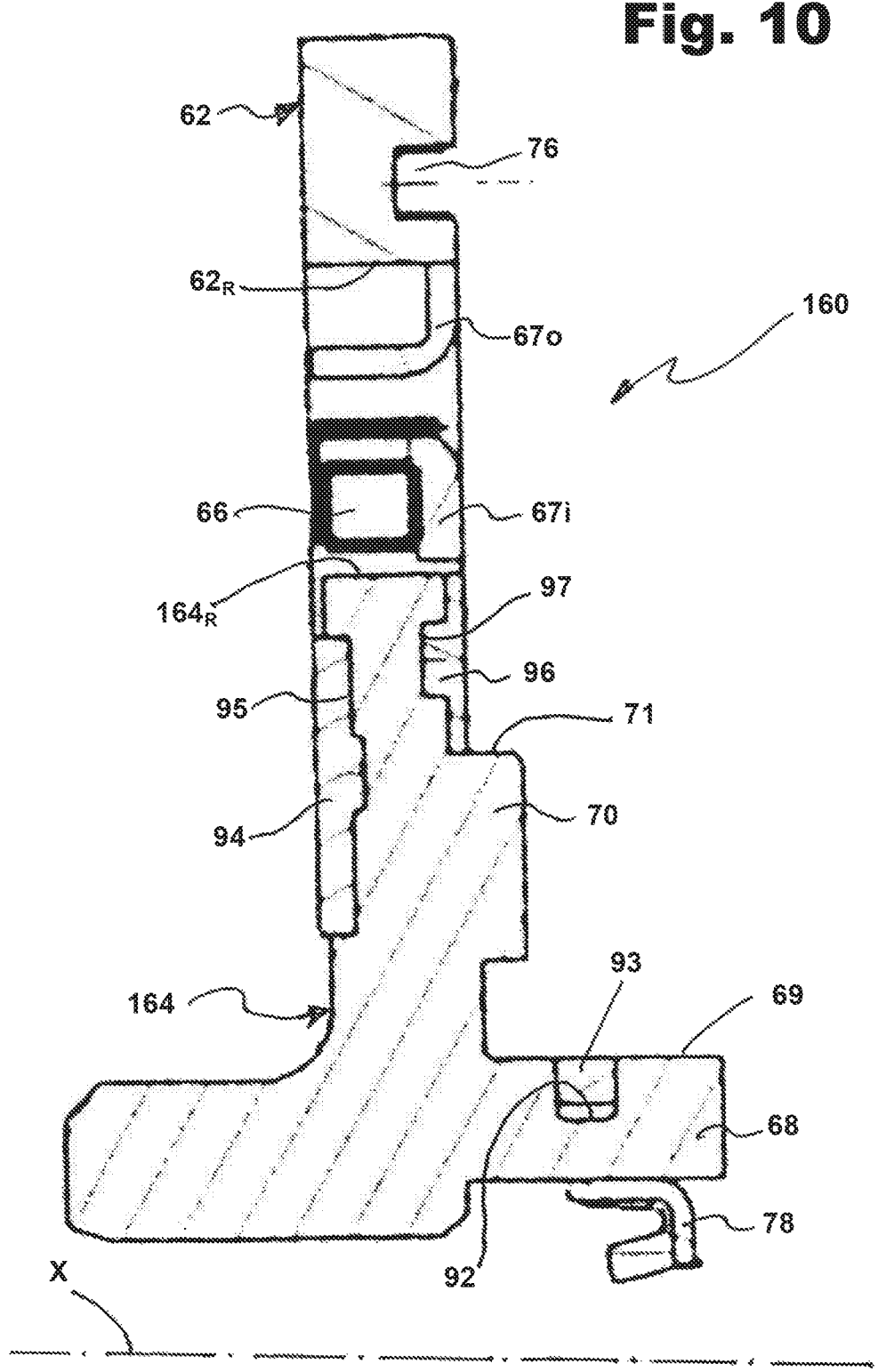
FIG. 10 is a cross-sectional half-view of the one-way turbine clutch of FIG. 9.

In a hydrokinetic torque converter 110 of a second exemplary embodiment illustrated in FIGS. 8-10, the one-way turbine clutch 60 is replaced by a one-way turbine clutch 160. The hydrokinetic torque converter 110 of FIGS. 8-10 corresponds substantially to the hydrokinetic torque converter 10 of FIGS. 1-7, and only the one-way turbine clutch 160, which principally differs, will therefore be explained in detail below.

According to the second exemplary embodiment of the present invention as best illustrated in FIGS. 8-10, the one-way turbine clutch 160 is configured to prevent the turbine wheel 32 from counter-rotation. In other words, similarly to the one-way turbine clutch 60, the one-way turbine clutch 160 permits rotational movement of the turbine wheel 32 in one circumferential direction only. The one-way turbine clutch 160, as best shown in FIG. 10, includes an outer ring 62 coaxial with the rotational axis X, an inner ring 164 coaxial with and radially spaced from the outer ring 62 to allow relative rotation of the outer and inner rings 62 and 164, respectively, and a plurality of engagement components 66 circumferentially disposed in an annular space defined between the outer ring 62 and the inner ring 164.

Also similarly to the one-way turbine clutch 60, the outer ring 62 of the one-way turbine clutch 160 has an annular radially outer racetrack surface $62_R$ and the inner ring 164 has an annular radially inner racetrack surface $164_R$ facing and spaced radially apart from the radially outer race surface $62_R$. As best shown in FIG. 10, the radially inner racetrack surface $164_R$ of the inner ring 164 is disposed radially inside the radially outer racetrack surface $62_R$ of the outer ring 62. The engagement components 66 configured to engage the radially opposite outer racetrack surface $62_R$ and the inner racetrack surface $164_R$.

The one-way turbine clutch 160 further includes low-friction, annular, sliding first and second bearing washers 94 and 96, respectively. As best shown in FIG. 9, the low-friction first bearing washer 94 is disposed axially between the retainer plate $77_R$ and the inner ring 164 of the one-way turbine clutch 160 so as to reduce friction therebetween when the outer ring 62 of the one-way turbine clutch 160 rotates relative to the inner ring 164 thereof. The first bearing washer 94 is mounted to a corresponding annular first recess 95 in a left axially outer sidewall of the inner ring 164 of the one-way turbine clutch 160, as best shown in FIG. 10. Similarly, the second bearing washer 96 is disposed axially between the driven member 84 of the torsional vibration damper 16 and the inner ring 164 of the one-way turbine clutch 160 so as to reduce friction therebetween when the outer ring 62 of the one-way turbine clutch 160 rotates relative to the inner ring 164 thereof. The low-friction second bearing washer 96 is mounted to a corresponding annular second recess 97 in a right axially outer sidewall of the inner ring 164 of the one-way turbine clutch 160, as best shown in FIG. 10.

Each of the first and second low-friction bearing washers 94 and 96 is made of a durable low-friction material, such as phenolic plastic (or phenolic resins) or nylon. Other suitable durable and low friction plastic or other material may also be used. The first and second bearing washers 94 and 96 reduce the friction and wear of the components of the one-way turbine clutch 160.

Moreover, the retainer plate $77_R$ of the turbine wheel 32 is configured to retain the engagement components 66 between the outer ring 62 and the inner ring 164, and to prevent axial movement of the first bearing washer 94, the inner ring 164 and the engagement components 66 of the one-way turbine clutch 160 relative to the outer ring 62 along the rotational axis X in the direction from right to right as shown in FIG. 9. Similarly, the driven member 84 of the torsional vibration damper 16 is configured to retain the engagement components 66 between the outer ring 62 and the inner ring 164, and to prevent axial movement of the second bearing washer 96, the inner ring 164 and the engagement components 66 of the one-way turbine clutch 160 relative to the outer ring 62 along the rotational axis X in the direction from left to right as shown in FIG. 9.

In a hydrokinetic torque converter 210 of a third exemplary embodiment illustrated in FIGS. 11-19B, the turbine wheel 32, the torsional vibration damper 16 and the one-way turbine clutch 60 are replaced by a turbine wheel 232, a torsional vibration damper 216 and a one-way turbine clutch 260. The hydrokinetic torque converter 210 of FIGS. 11-19B corresponds substantially to the hydrokinetic torque converter 10 of FIGS. 1-7, and only the turbine wheel 232, the torsional vibration damper 216 and the one-way turbine clutch 260, which principally differs, will therefore be explained in detail below.

According to the third exemplary embodiment of the present invention, the turbine wheel 232 includes a substantially toroidal turbine shell 233, and a substantially annular retainer plate 277 extending substantially radially inwardly from a radially inner end 233$i$ of the toroidal turbine shell 233, as best shown in FIGS. 12, 13, 15A and 15B. According to the third exemplary embodiment of the present invention, the turbine shell 233 with the retainer plate 277 is an integral (or unitary) component, e.g., made as a single part, but may be separate components fixedly connected together. The turbine shell 233 with the retainer plate 277, the turbine core ring 30 and the turbine blades 31 are conventionally formed by stamping from steel blanks. The turbine wheel 232 further includes a substantially annular turbine core ring 38, and a plurality of turbine blades 39 fixedly (i.e., non-moveably) attached, such as by brazing, to the turbine shell 233 and the core ring 38. The rotation of the impeller wheel 30 causes fluid in the torus to rotate the turbine blades 39, and hence the turbine shell 233. The turbine wheel 232 further includes a plurality of turbine drive arms 286 extending substantially axially toward the torsional vibration damper 216, as best shown in FIGS. 12, 13, 15A, 15B and 16.

Figure 11:
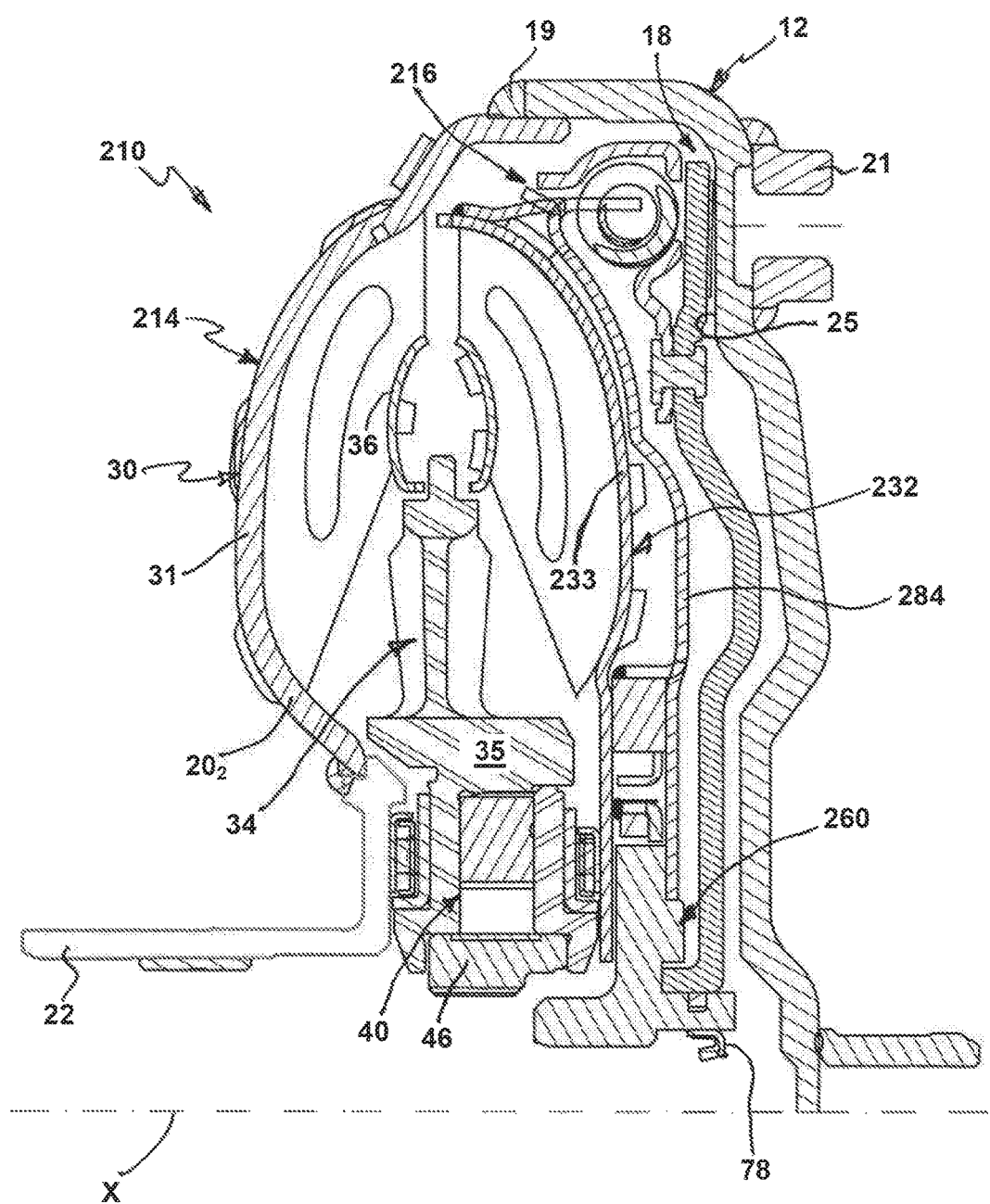
FIG. 11 is a fragmented half-view in axial section of a hydrokinetic torque converter in accordance with a third exemplary embodiment of the present invention.

According to the third exemplary embodiment of the present invention as best illustrated in FIGS. 11-19B, the torsional vibration damper 216 is housed in the casing 12 axially between the turbine wheel 232 and the first casing shell $20_1$ of the casing 12, as best shown in FIG. 11. The torsional vibration damper 216 includes a substantially annular drive (or input) member 80, a plurality of circumferential elastic damping members 82 circumferentially equidistantly spaced from one another, and a substantially annular driven (or output) member 284. According to the exemplary embodiment of FIG. 11, the elastic damping members 82 are configured as helical (or coil) springs having a principal axis oriented substantially circumferentially. Other elastic members may be selected to replace or supplement the springs 82. The drive member 80 and the driven member 284 engage circumferentially opposite ends of the elastic damping members 82. Accordingly, the drive member 80 is elastically coupled to the driven member 284 through the elastic damping members 82, as is well known in the art. Thus, the driven member 284 of the torsional vibration damper 216 is rotatable relative to the drive member 80 due to elasticity of the elastic damping members 82, which absorb torsional vibration.

A radially outer free end of driven member 284 carries a plurality of driven (or output) arms $284_D$ extending substantially axially toward the elastic damping members 82 of the torsional vibration damper 216, and a plurality of driven fingers $284_C$ extending substantially axially toward the turbine drive arms 286 of the turbine wheel 232.

Figure 17:
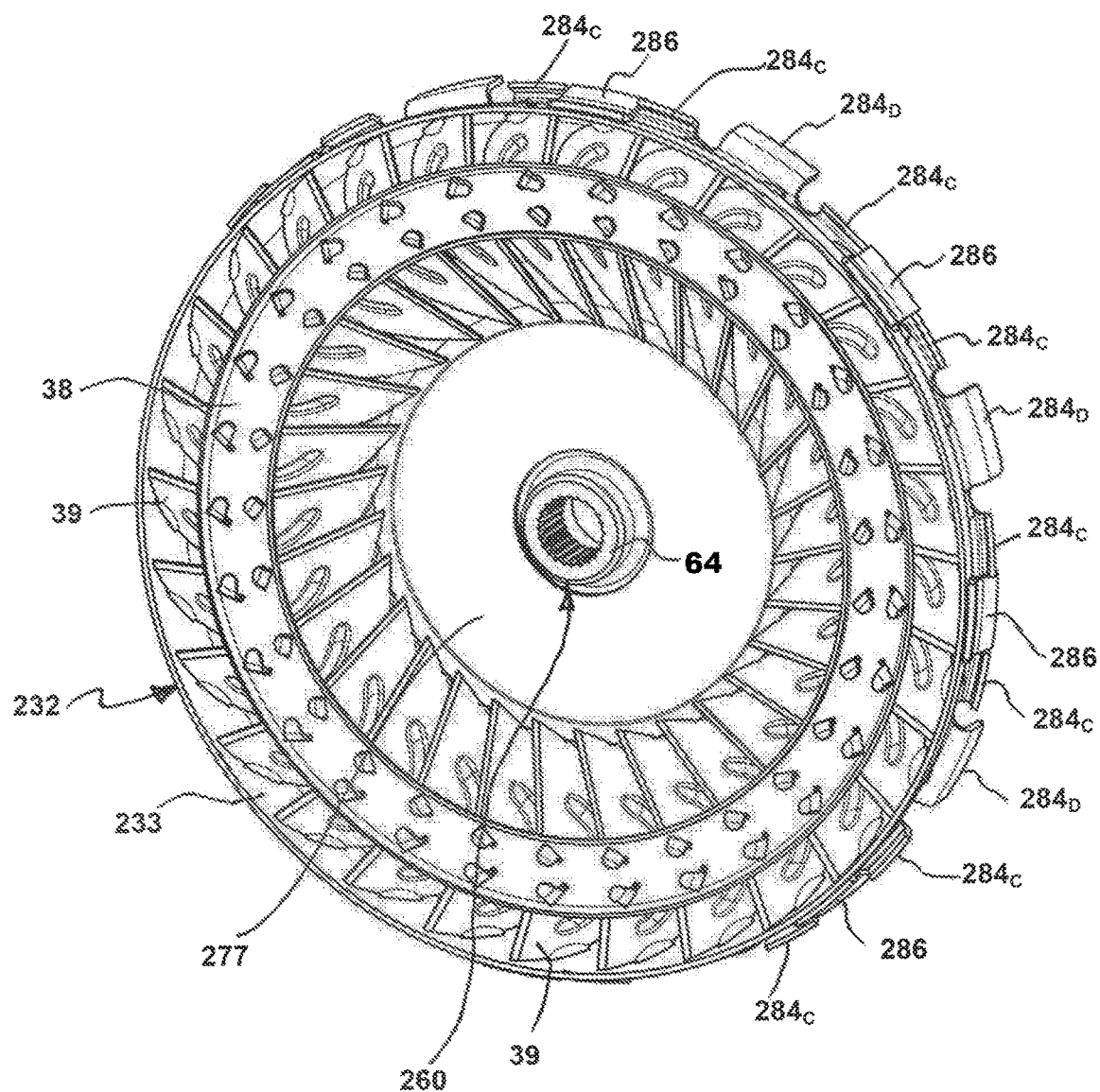
FIG. 17 is a front perspective view of the turbine wheel of the hydrokinetic torque converter in accordance with the third exemplary embodiment of the present invention with the one-way turbine clutch mounted thereto.
Figure 18:
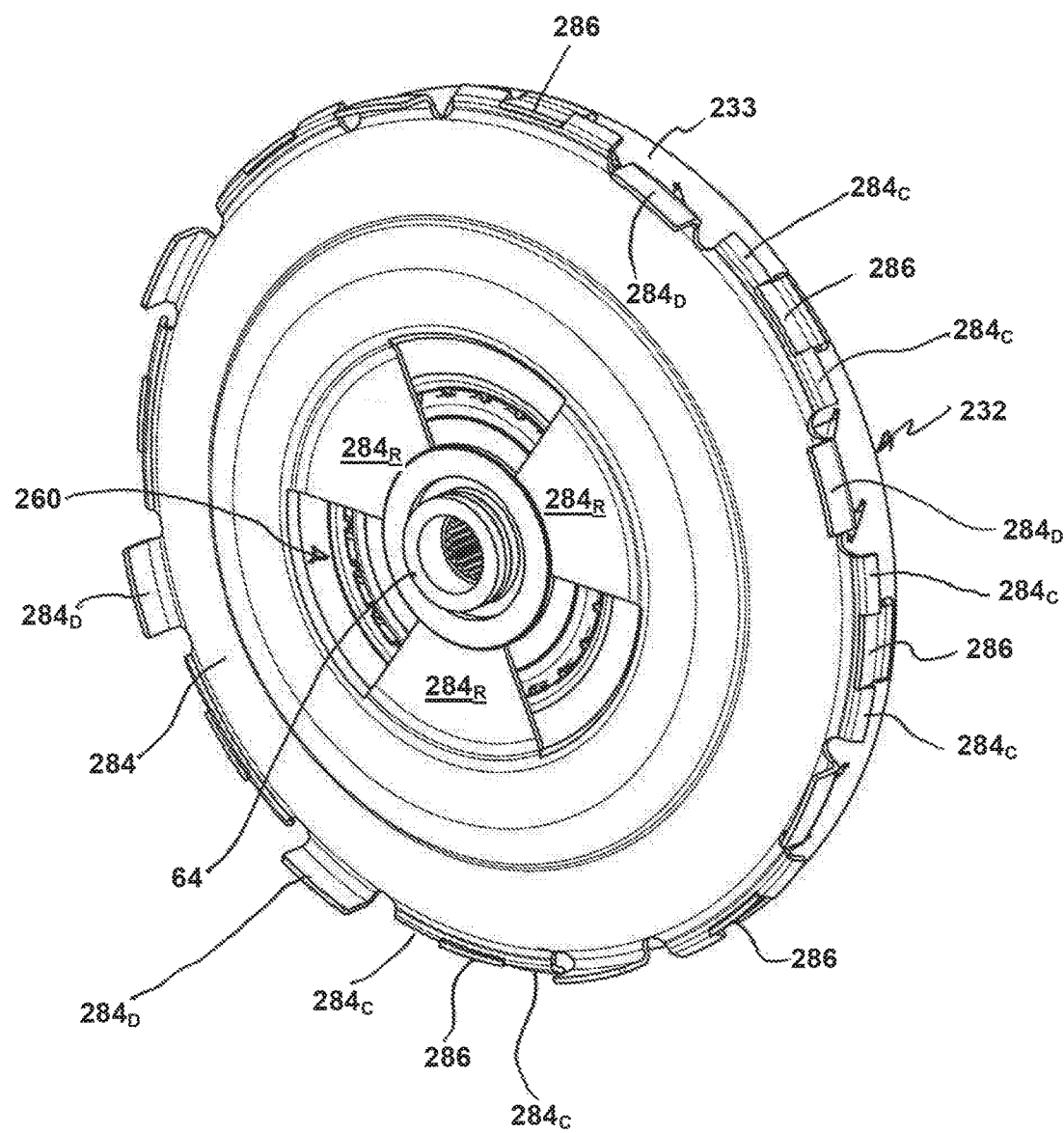
FIG. 18 is a front perspective view of a torsional vibration damper of the hydrokinetic torque converter in accordance with the third exemplary embodiment of the present invention.
Figure 19A:
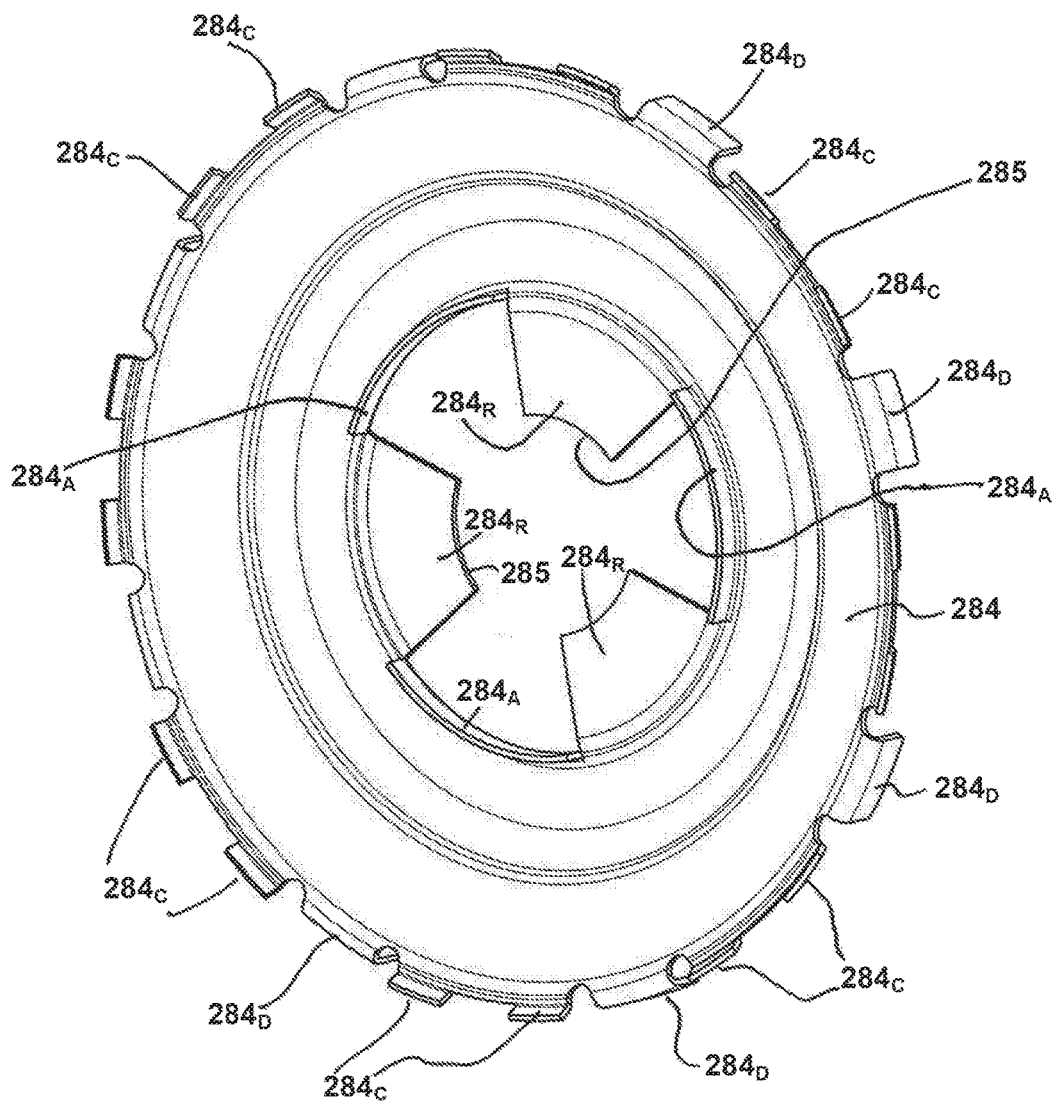
FIG. 19A is a front perspective view of an output member of the torsional vibration damper of the hydrokinetic torque converter in accordance with the third exemplary embodiment of the present invention.
Figure 19B:
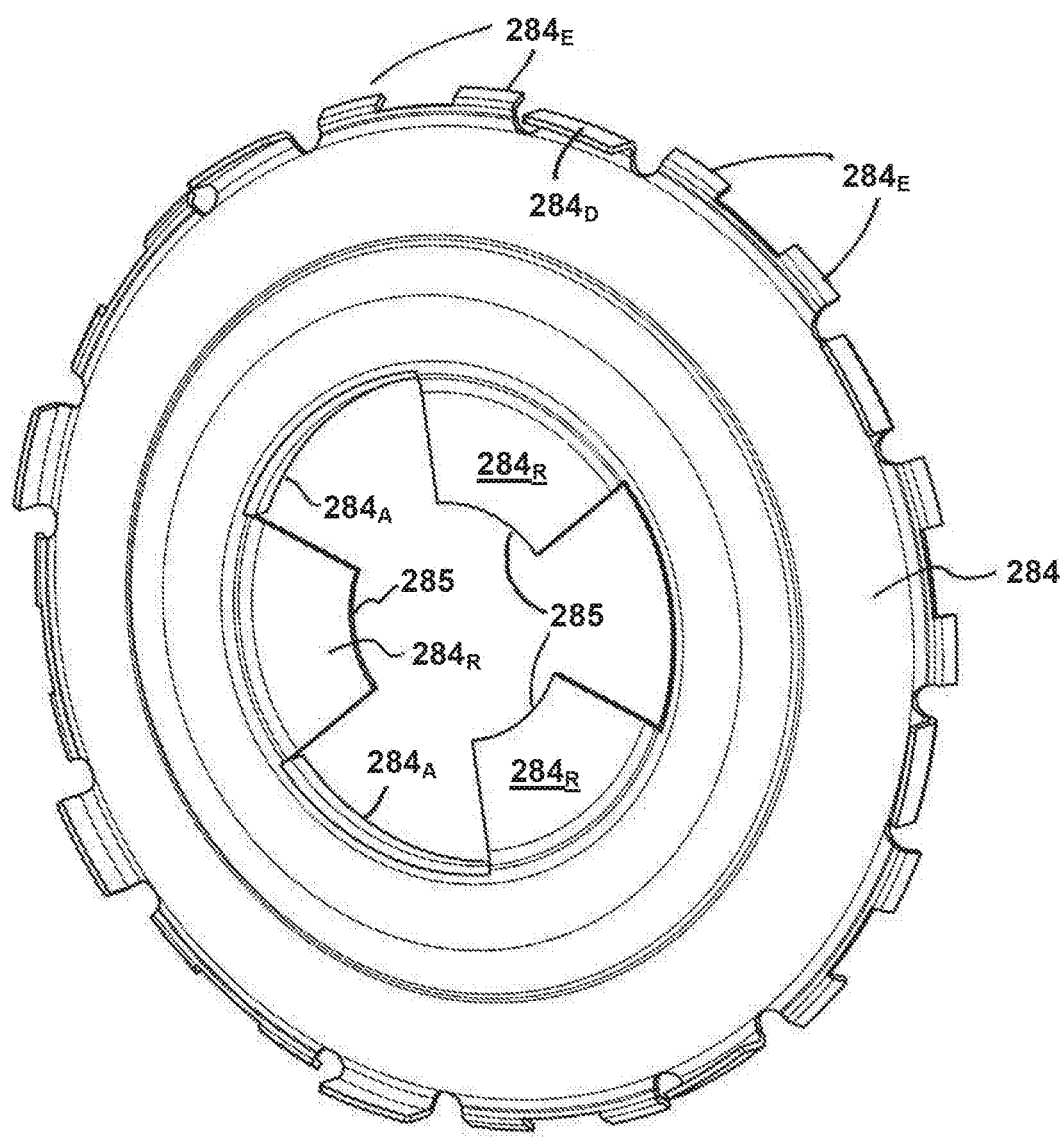
FIG. 19B is a rear perspective view of the output member of the torsional vibration damper of the hydrokinetic torque converter in accordance with the third exemplary embodiment of the present invention.

The drive member 80 and the driven arms $284_D$ of the driven member 284 engage circumferentially opposite ends of the elastic damping members 82, so that the drive member 80 is axially moveable relative to the driven member 284. Accordingly, the drive member 80 is elastically coupled to the driven member 284 through the elastic damping members 82, as is well known in the art. Thus, the driven member 284 of the torsional vibration damper 216 is rotatable relative to the drive member 80 due to elasticity of the elastic damping members 82, which absorb torsional vibration. Moreover, the driven member 284 of the torsional vibration damper 216 is non-rotatably coupled to the turbine wheel 232. Specifically, the driven fingers $284_C$ of the driven member 284 of the torsional vibration damper 216 circumferentially engage the turbine drive arms 286 of the turbine wheel 232 with practically no play in the circumferential direction. As best shown in FIGS. 17 and 18, each of the turbine drive arms 286 of the turbine wheel 232 is non-rotatably engaged between a pair of driven fingers $284_C$ of the driven member 284 of the torsional vibration damper 216.

Figure 12:
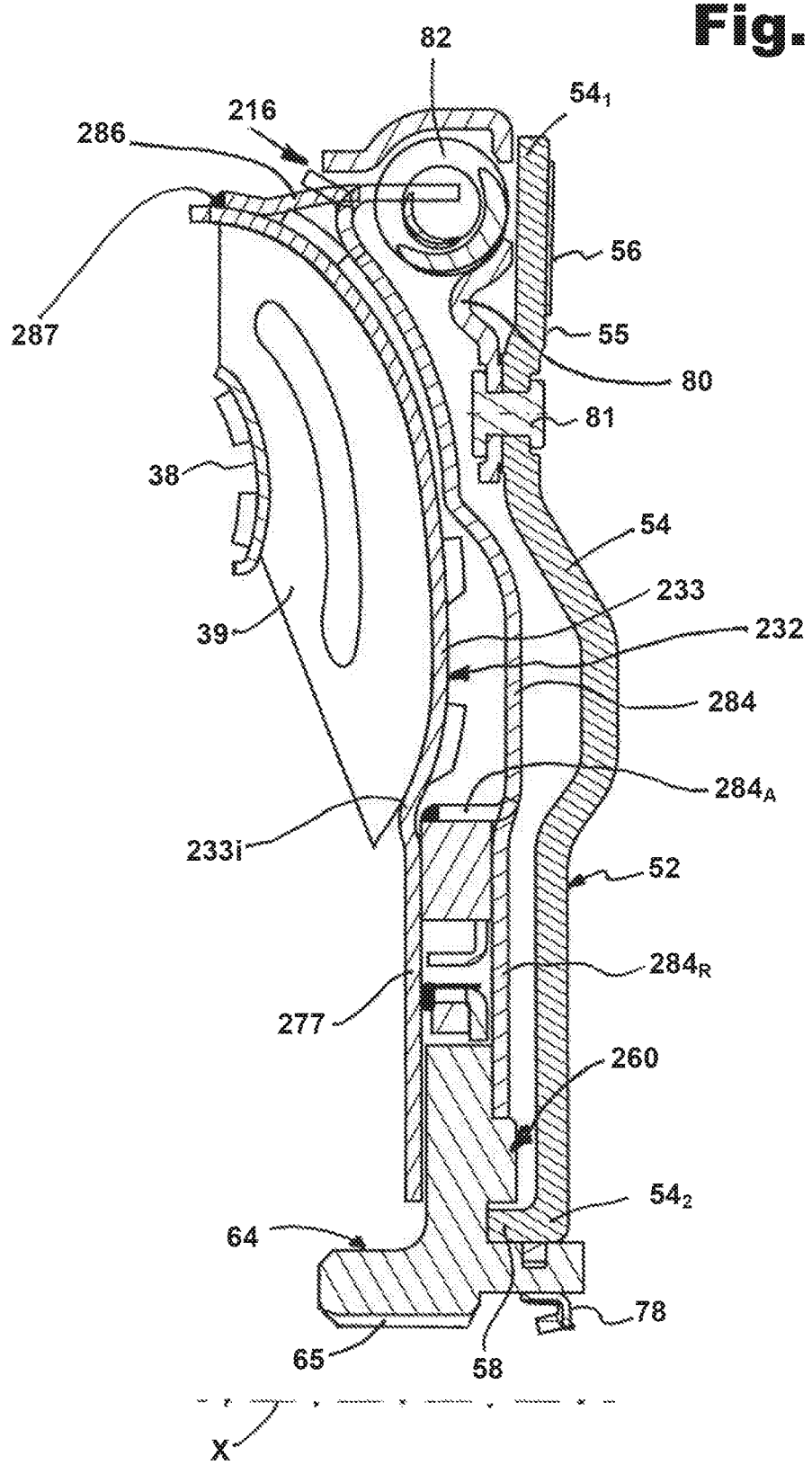
FIG. 12 is a fragmented half-view in axial section of a turbine wheel, a locking piston and a one-way turbine clutch of the hydrokinetic torque converter in accordance with the third exemplary embodiment of the present invention.
Figure 13:
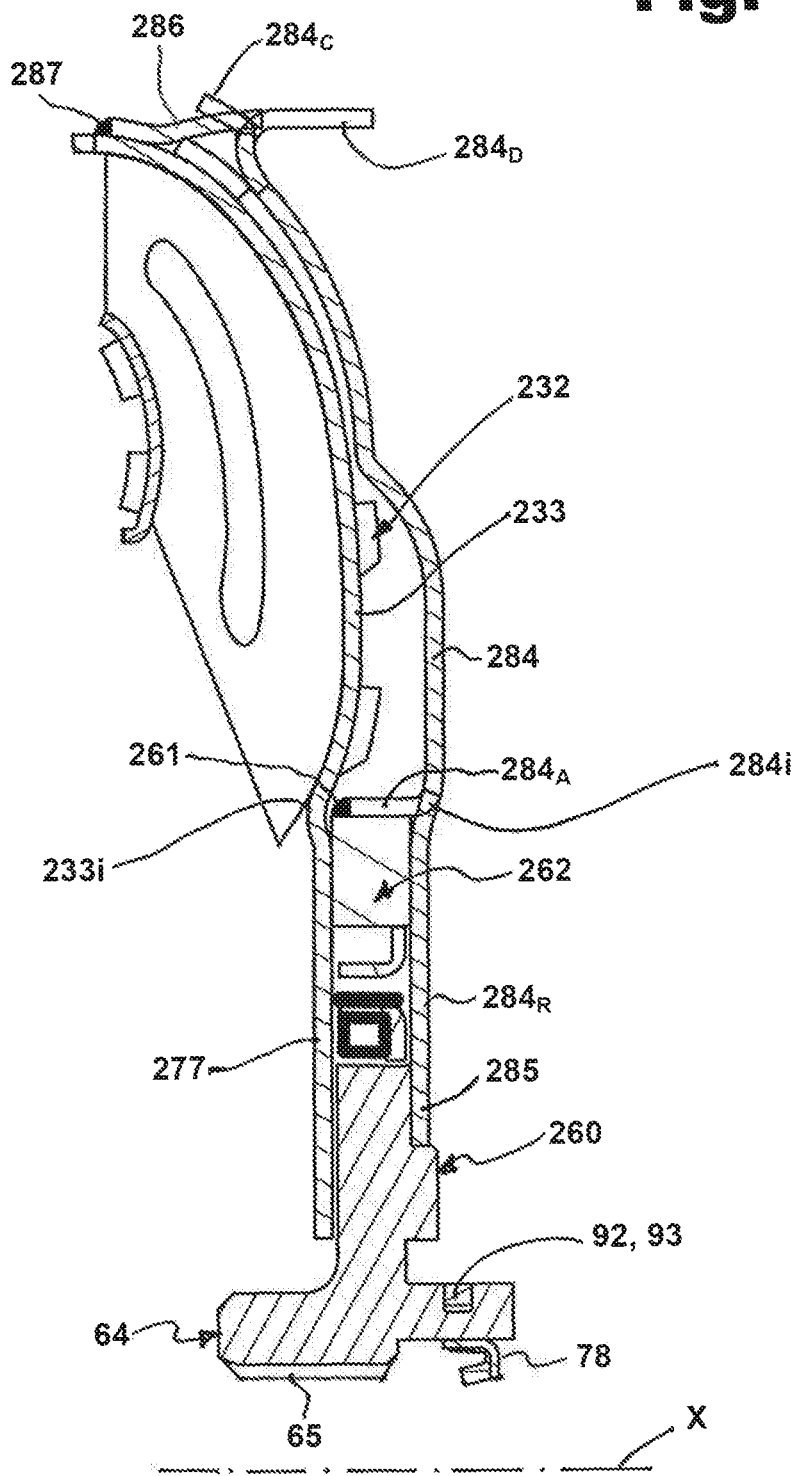
FIG. 13 is a fragmented half-view in axial section of the turbine wheel and the one-way turbine clutch of the hydrokinetic torque converter in accordance with the third exemplary embodiment of the present invention.

The driven member 284 of the torsional vibration damper 216 further includes one or more (preferably three) coupling members $284_A$ extending substantially axially outwardly from a radially inner end 284$i$ of the driven member 284 in the direction toward the turbine wheel 232, and one or more (preferably three) guide plates $284_R$ extending substantially radially inwardly from the radially inner end 284$i$ of the driven member 284 past the engagement components 66 and partially overlapping the inner ring 64 of the one-way turbine clutch 260, as best shown in FIGS. 12 and 13. According to the third exemplary embodiment of the present invention, the driven member 284 with the coupling members $284_A$ and the guide plates $284_R$ is an integral (or unitary) component, e.g., made of a single part, but may be separate components fixedly connected together.

Figure 14:
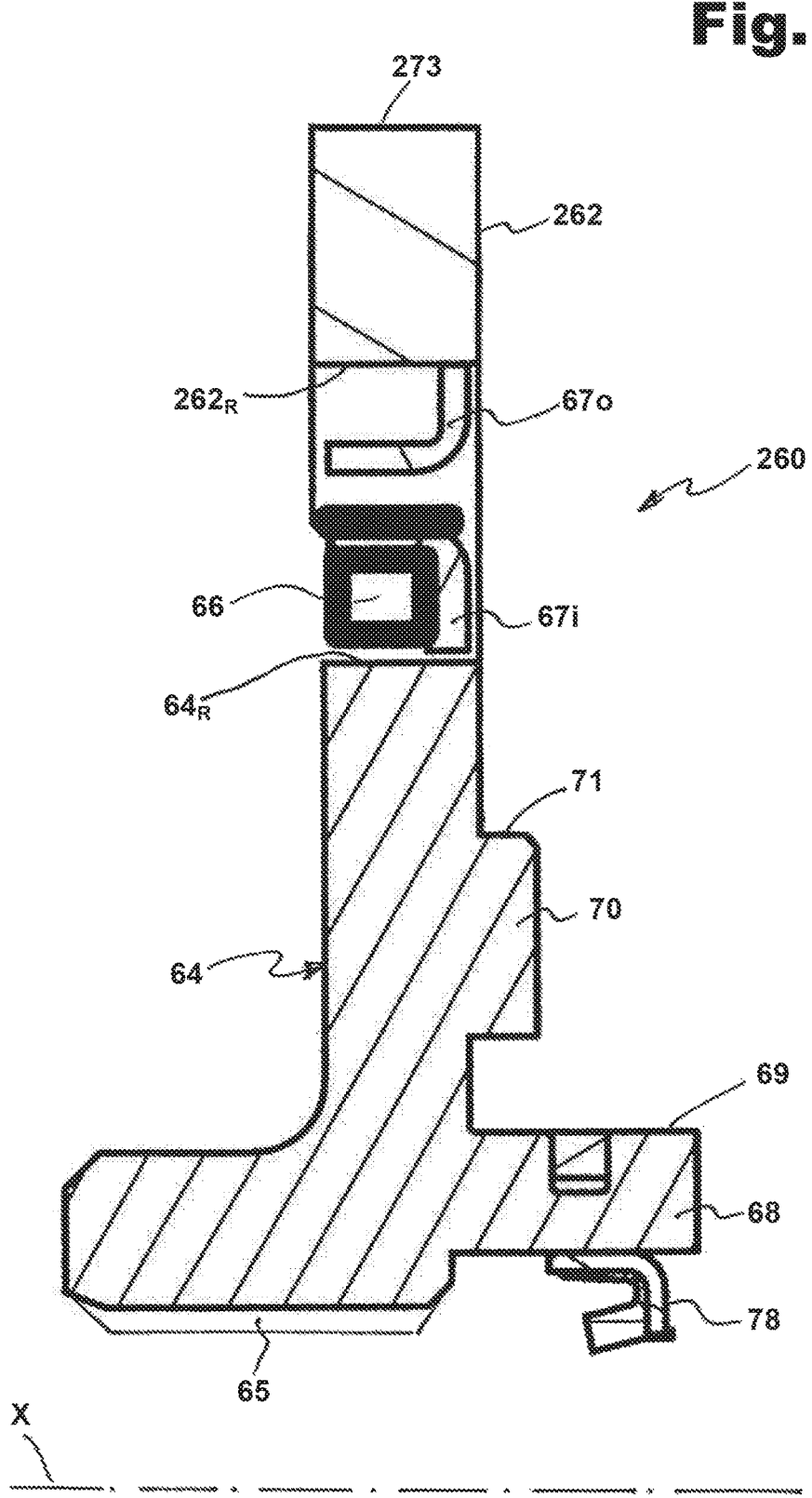
FIG. 14 is a cross-sectional half-view of the one-way turbine clutch of FIG. 13.
Figure 15A:
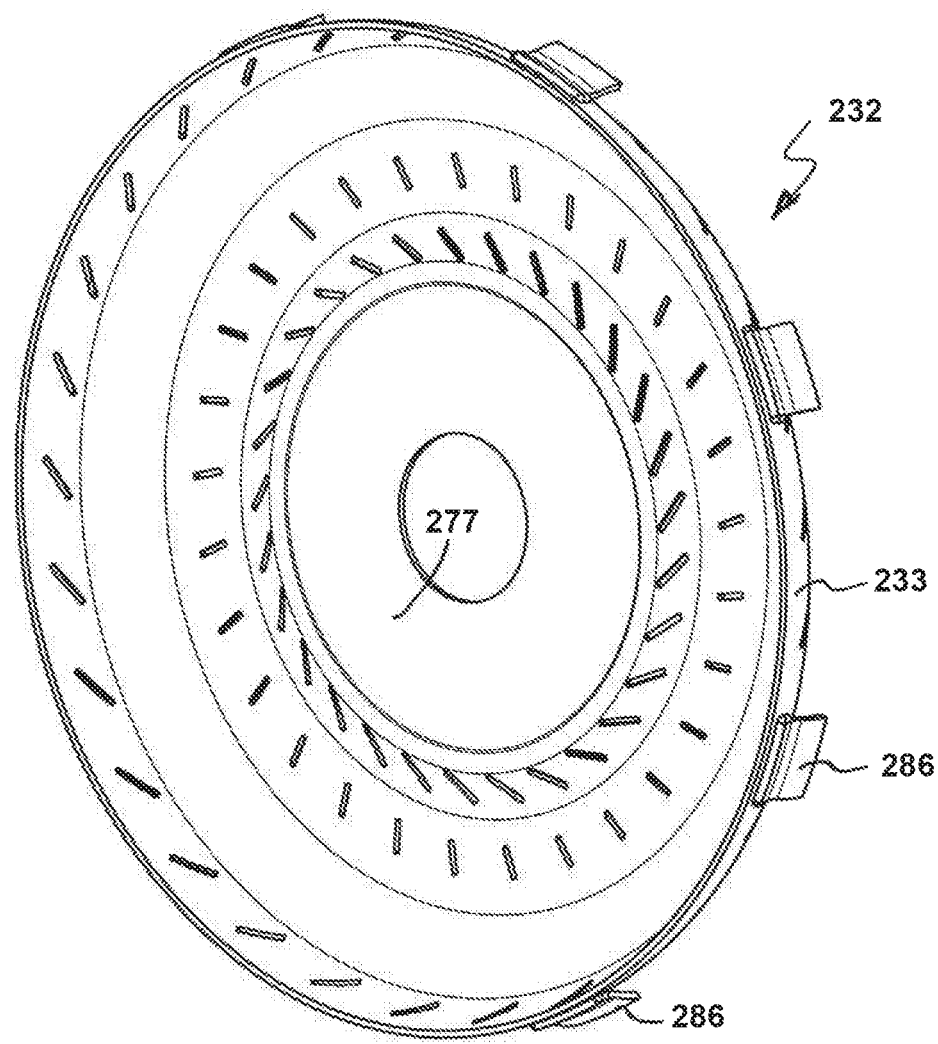
FIG. 15A is a partial front perspective view of the turbine wheel of the hydrokinetic torque converter in accordance with the third exemplary embodiment of the present invention.
Figure 15B:
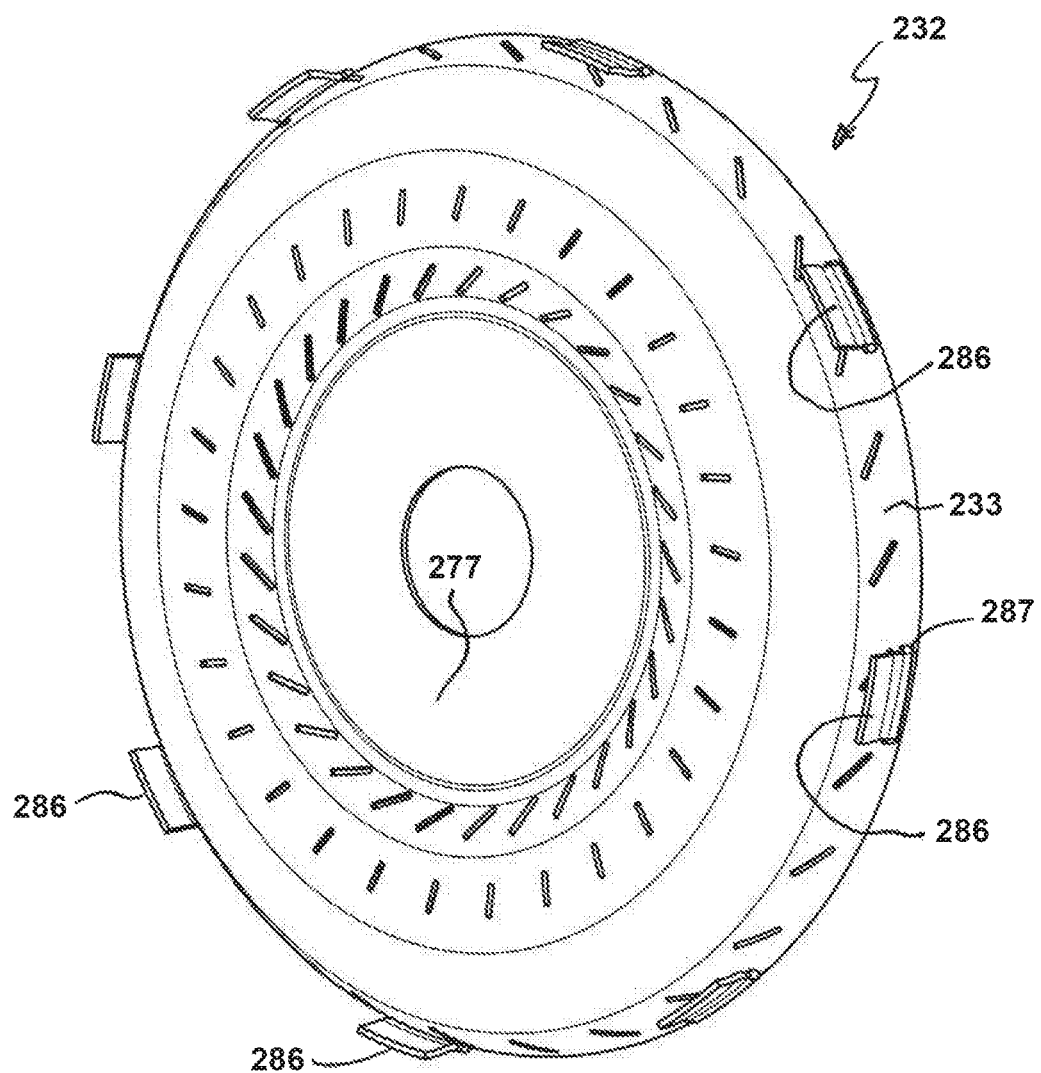
FIG. 15B is a partial rear perspective view of the turbine wheel of the hydrokinetic torque converter in accordance with the third exemplary embodiment of the present invention.

According to the third exemplary embodiment of the present invention as best illustrated in FIGS. 11-19B, the one-way turbine clutch 260 is provided to prevent the turbine wheel 232 from counter-rotation. In other words, similarly to the one-way turbine clutch 60, the one-way turbine clutch 260 permits rotational movement of the turbine wheel 232 in one circumferential direction only. The one-way turbine clutch 260, as best shown in FIGS. 12-14, includes an outer ring 262 coaxial with the rotational axis X, an inner ring 64 coaxial with and radially spaced from the outer ring 262 to allow relative rotation of the outer and inner rings 262 and 64, respectively, and a plurality of engagement components 66 circumferentially disposed in an annular space defined between the outer ring 262 and the inner ring 64.

Also similarly to the one-way turbine clutch 60, the outer ring 262 of the one-way turbine clutch 260 has an annular radially outer racetrack surface $262_R$ and the inner ring 64 has an annular radially inner racetrack surface $64_R$ facing and spaced radially apart from the radially outer race surface $262_R$. As best shown in FIG. 13, the radially inner racetrack surface $64_R$ of the inner ring 64 is disposed radially inside the radially outer racetrack surface $262_R$ of the outer ring 262. The engagement components 66 configured to engage the radially opposite outer racetrack surface $262_R$ and the inner racetrack surface $64_R$.

The driven member 284 of the torsional vibration damper 216 is non-moveably attached (i.e., fixed) to the outer ring 262 of the one-way turbine clutch 260. Specifically, as best shown in FIG. 13, each of the coupling members $284_A$ of the driven member 284 is disposed on a radially outer surface 273 of the outer ring 262 and fixed to the outer ring 262 of the one-way turbine clutch 260, such as by welding at weld 261, at an axially distal, annular free end of each of the coupling members $284_A$ of the driven member 284. In other words, the outer ring 262 of the one-way turbine clutch 260 is non-rotatably coupled to both the turbine wheel 232 and the driven member 284 of the torsional vibration damper 216.

Moreover, the guide plates $284_R$ of the driven member 284 are configured to retain the engagement components 66 between the outer ring 262 and the inner ring 64 of the one-way turbine clutch 260, and to prevent axial movement of the inner ring 64 and the engagement components 66 of the one-way turbine clutch 260 relative to the outer ring 262 along the rotational axis X in the direction from left to right as shown in FIGS. 11-13. As best shown in FIG. 13, a radially inner (or distal) end 285 of each of the guide plates $284_R$ of the driven member 284 slidingly engages the radially outer guide surface 71 of the guide ledge 70 of the output hub 64 so as to center and radially support the driven member 284 of the torsional vibration damper 216.

A method for assembling the hydrokinetic torque converter 210 is as follows. First, the impeller wheel 30, the turbine wheel 32, the stator 34, and the torsional vibration damper 16 with the locking piston 52 may each be preassembled. The impeller wheel 30 and the turbine wheel 32 are formed by stamping from steel blanks or by injection molding of a polymeric material. The stator 34 is made by casting from aluminum or injection molding of a polymeric material. The impeller wheel 30, the turbine wheel 32 and the stator 34 subassemblies are assembled together so as to form the fluid coupling 214.

Figure 16:
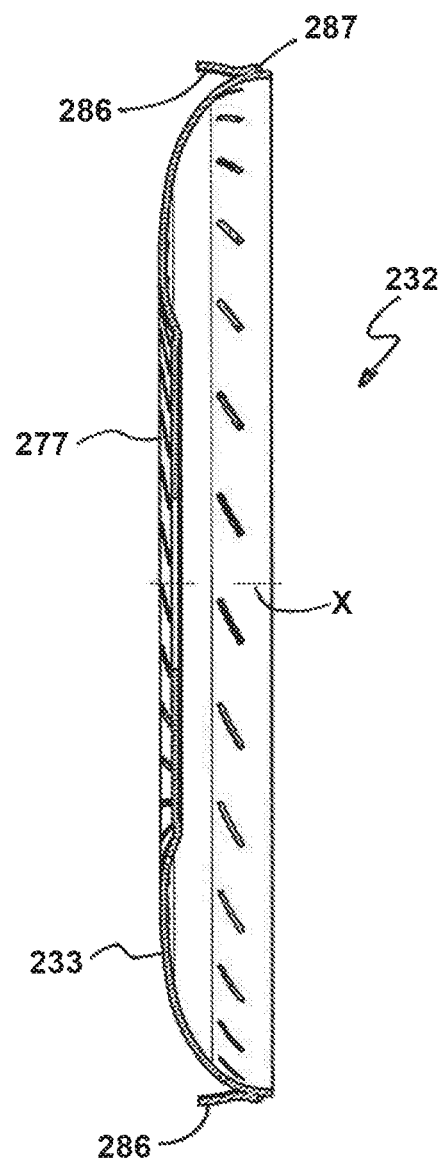
FIG. 16 is a partial cross-sectional view of the turbine wheel of FIG. 15B.

According to the exemplary embodiment of the present invention, the turbine wheel 232 is formed with the toroidal turbine shell 233, and a substantially annular retainer plate 277 extending substantially radially inwardly from a radially inner end 233i of the toroidal turbine shell 233, as best shown in FIGS. 11, 12 and 16. According to the exemplary embodiment of the present invention, the turbine shell 233 with the retainer plate 277 is an integral (or unitary) component, e.g., made of a single part, but may be separate components fixedly connected together.

The torsional vibration damper 216 is then added. Before the torsional vibration damper 216 is assembled, the turbine drive arms 286 are non-movably connected (i.e., fixed) to the toroidal turbine shell 233 of the turbine wheel 32 by appropriate means, such as by welding at weld 287 or mechanical fasteners, at a radially distal end of the turbine shell 233 of the turbine wheel 232, as shown in FIGS. 12, 13, 15A, 15B and 16. Next, the locking piston body 54 of the lo locking piston 52 is fixed to the input member 80 of the torsional vibration damper 16 by appropriate means, such as by welding, adhesive bonding or fasteners, such as the rivets 81.

The one-way turbine clutch 260 is then added. The driven member 284 of the one-way turbine clutch 260 is provided with the coupling members $284_A$, the guide plates $284_R$, the driven fingers $284_C$ and the driven arms $284_D$ of the driven member 284 as an integral (or unitary) component, e.g., made of a single part. Next, the driven member 284 is non-rotatably connected to the outer ring 262 of the one-way turbine clutch 260. Specifically, each of the coupling members $284_A$ of the driven member 284 is positioned on a radially outer surface 273 of the outer ring 262 and fixed to the outer ring 262 of the one-way turbine clutch 260, such as by welding at weld 261, at an axially distal, annular free end of each of the coupling members $284_A$ of the driven member 284. Thus, the outer ring 262 of the one-way turbine clutch 260 is non-rotatably coupled to both the turbine wheel 232 and the driven member 284 of the torsional vibration damper 216. At the same time, the radially inner end 285 of the driven member 284 slidingly engages the radially outer guide surface 71 of the guide ledge 70 of the output hub 64. Then, the first casing shell $20_1$ is non-moveably and sealingly secured, such as by welding at 19, to the second casing shell $20_2$, as best shown in FIG. 11.

In a hydrokinetic torque converter 310 of a fourth exemplary embodiment illustrated in FIGS. 20-23, the one-way turbine clutch 260 is replaced by a one-way turbine clutch 360. The hydrokinetic torque converter 310 of FIGS. 20-23 corresponds substantially to the hydrokinetic torque converter 210 of FIGS. 11-19B, and only the one-way turbine clutch 360, which differs, will therefore be explained in detail below.

Figure 22:
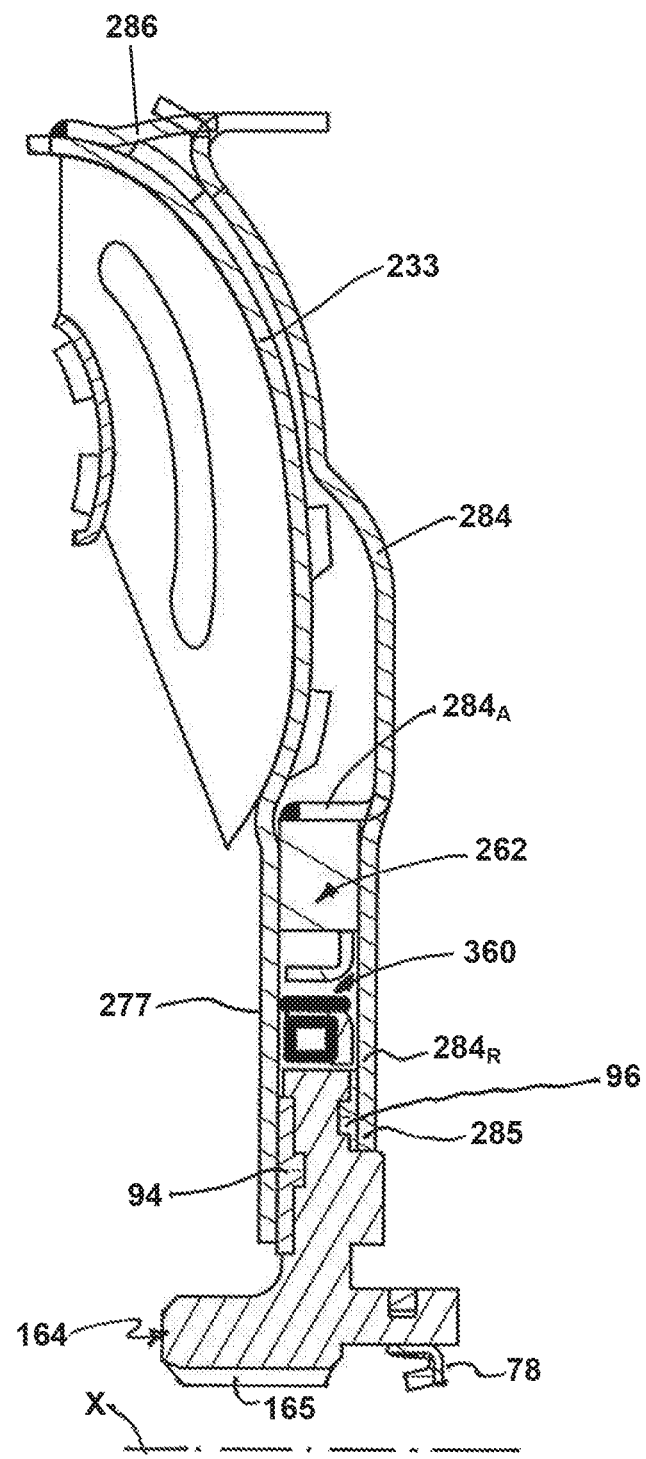
FIG. 22 is a fragmented half-view in axial section of the turbine wheel, the one-way turbine clutch and an output member of the torsional vibration damper of the hydrokinetic torque converter in accordance with the fourth exemplary embodiment of the present invention.
Figure 23:
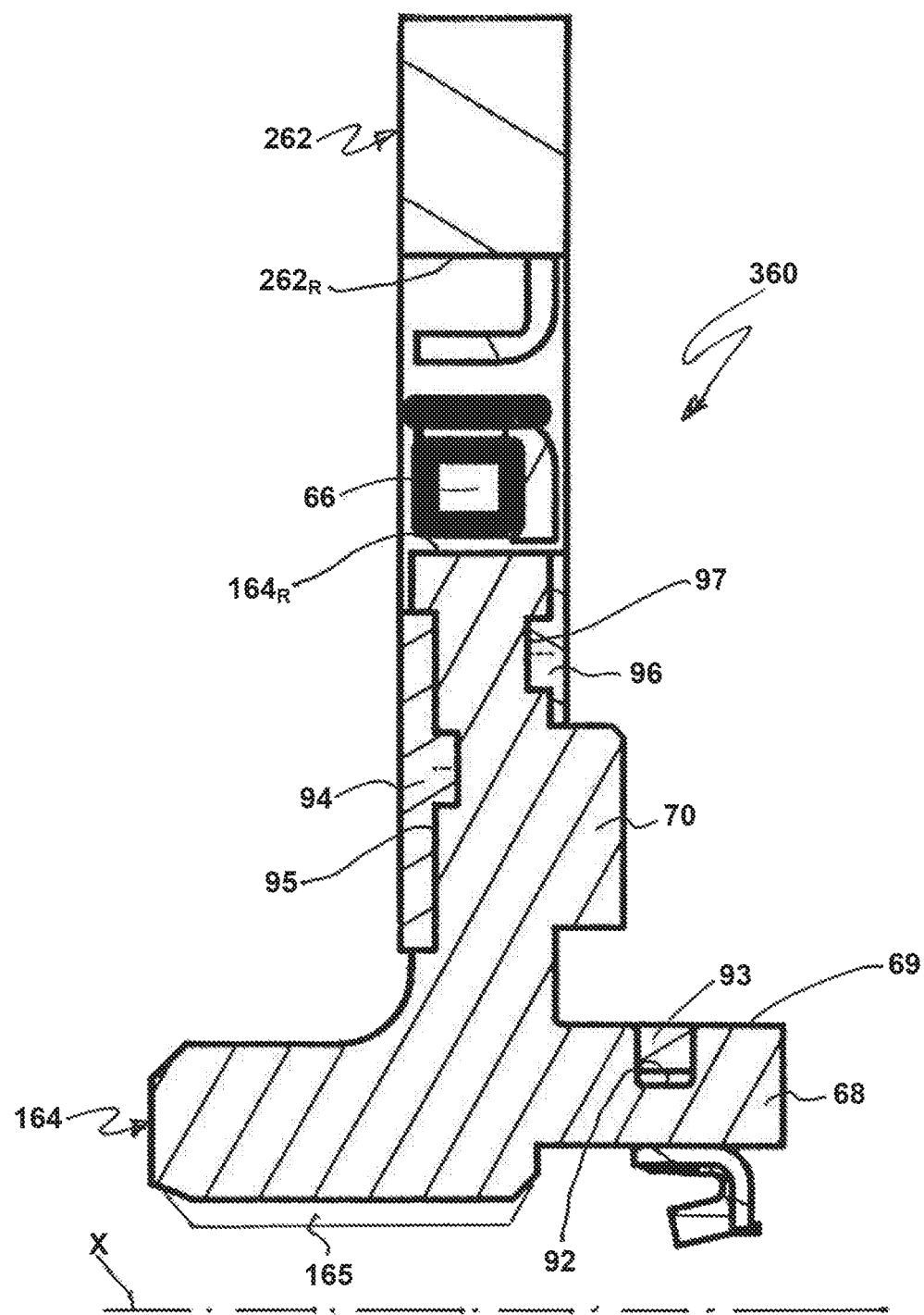
FIG. 23 is a cross-sectional half-view of the one-way turbine clutch of FIG. 22.

According to the fourth exemplary embodiment of the present invention as best illustrated in FIGS. 20-23, the one-way turbine clutch 360 is configured to prevent the turbine wheel 232 from counter-rotation. In other words, similarly to the one-way turbine clutch 260, the one-way turbine clutch 360 permits rotational movement of the turbine wheel 232 in one circumferential direction only. The one-way turbine clutch 360, as best shown in FIG. 23, includes an outer ring 262 coaxial with the rotational axis X, an inner ring 164 coaxial with and radially spaced from the outer ring 262 to allow relative rotation of the outer and inner rings 262 and 164, respectively, and a plurality of engagement components 66 circumferentially disposed in an annular space defined between the outer ring 262 and the inner ring 164.

Figure 20:
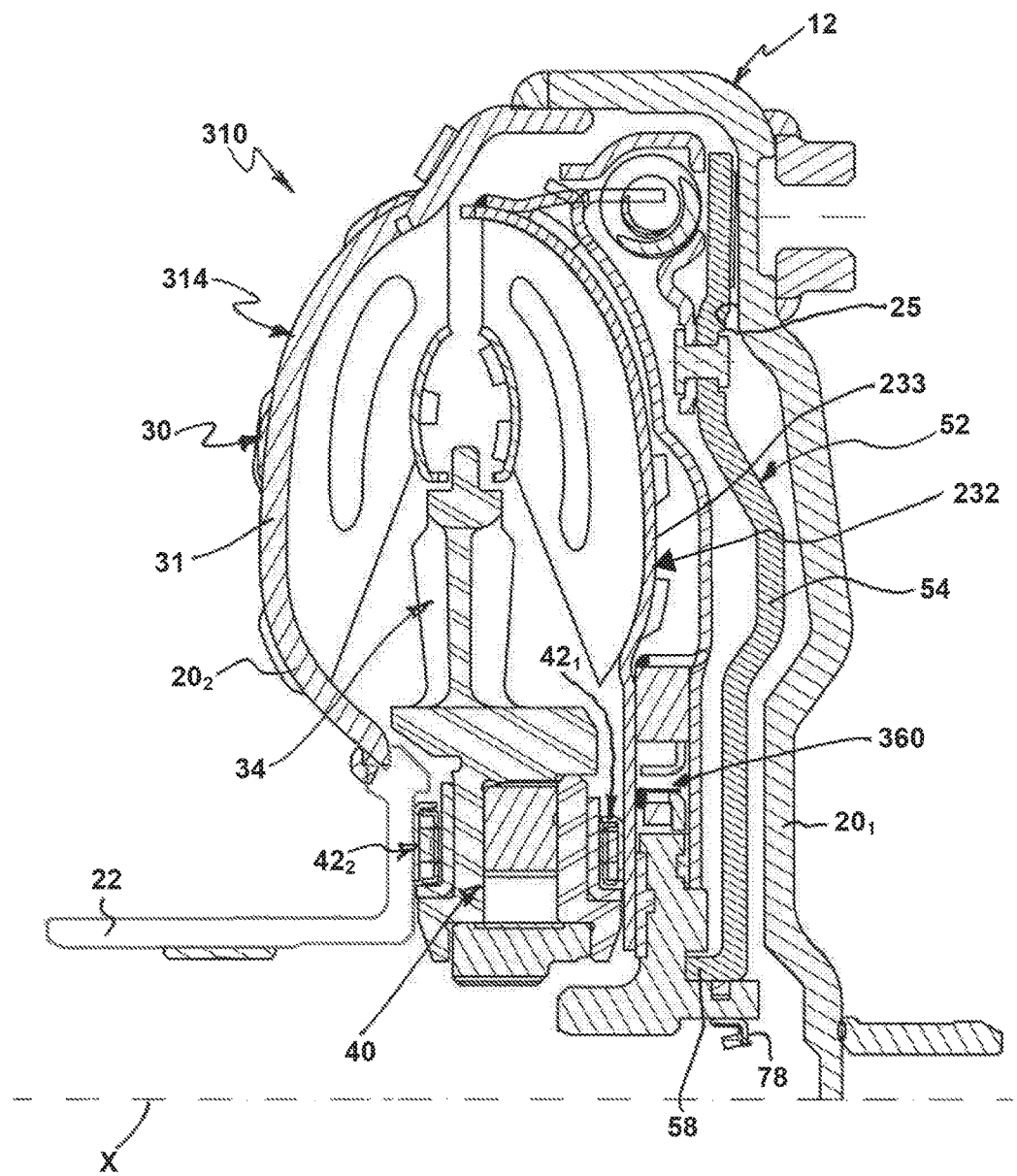
FIG. 20 is a fragmented half-view in axial section of a hydrokinetic torque converter in accordance with a fourth exemplary embodiment of the present invention.
Figure 21:
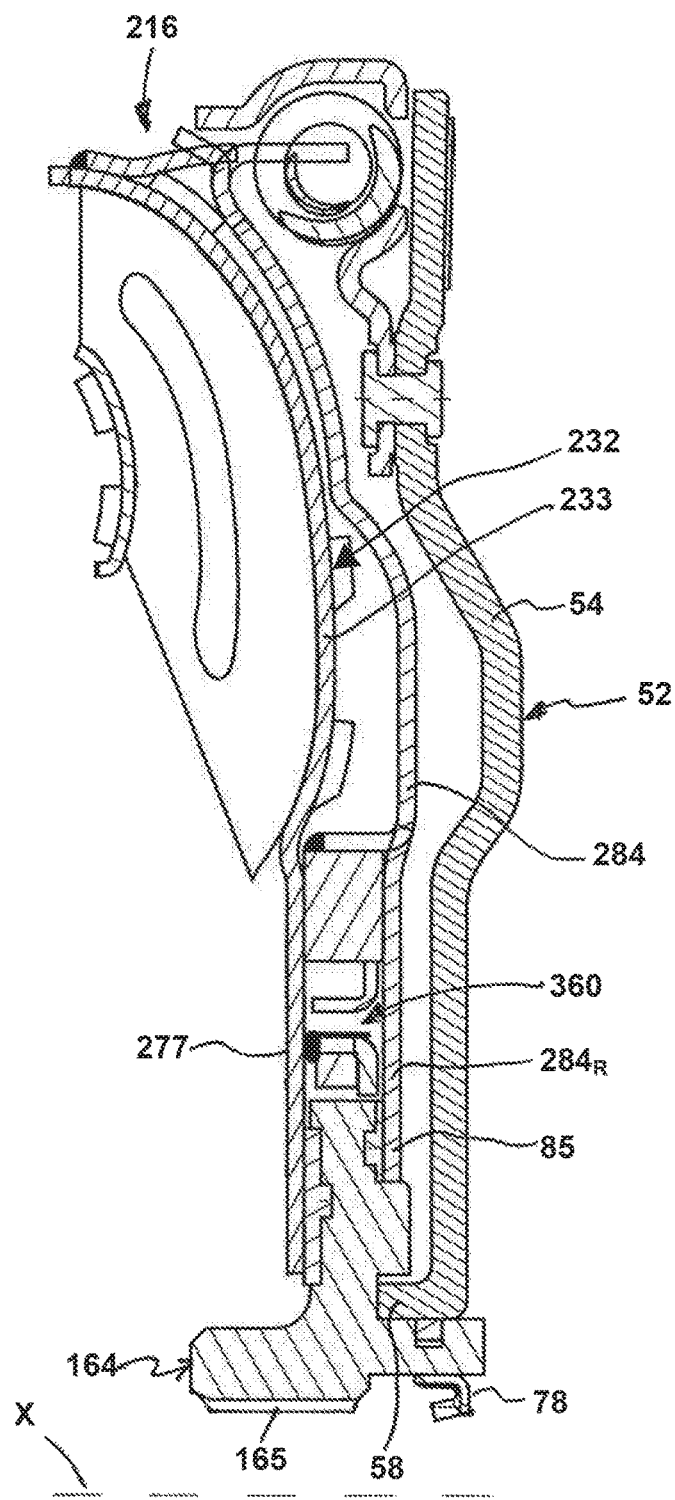
FIG. 21 is a fragmented half-view in axial section of a turbine wheel, a one-way turbine clutch and a torsional vibration damper of the hydrokinetic torque converter in accordance with the fourth exemplary embodiment of the present invention.

Also similarly to the one-way turbine clutch 260, the outer ring 262 of the one-way turbine clutch 360 has an annular radially outer racetrack surface $262_R$ and the inner ring 164 has an annular radially inner racetrack surface $164_8$ facing and spaced radially apart from the radially outer race surface $262_R$. As best shown in FIG. 20, the radially inner racetrack surface $164_R$ of the inner ring 164 is disposed radially inside the radially outer racetrack surface $262_R$ of the outer ring 262. The engagement components 66 configured to engage the radially opposite outer racetrack surface $262_R$ and the inner racetrack surface $164_R$.

The one-way turbine clutch 360 further includes low-friction, annular, sliding first and second bearing washers 94 and 96, respectively. The low-friction first bearing washer 94 is disposed axially between the annular retainer plate 277 of the turbine wheel 232 and the inner ring 164 of the one-way turbine clutch 360 so as to reduce friction therebetween when the outer ring 262 of the one-way turbine clutch 360 rotates relative to the inner ring 164 thereof. The first bearing washer 94 is mounted to a corresponding annular recess 95 in a left axially outer sidewall of the inner ring 164 of the one-way turbine clutch 260, as best shown in FIG. 23. Similarly, the second bearing washer 96 is disposed axially between the guide plates $284_R$ of the driven member 284 of the torsional vibration damper 216 and the inner ring 164 of the one-way turbine clutch 360 so as to reduce friction therebetween when the outer ring 262 of the one-way turbine clutch 360 rotates relative to the inner ring 164 thereof. The low-friction second bearing washer 96 is mounted to a corresponding annular recess 97 in a right axially outer sidewall of the inner ring 264 of the one-way turbine clutch 360, as best shown in FIG. 23.

Each of the first and second low-friction bearing washers 94 and 96 is made of a durable low-friction material, such as phenolic plastic (or phenolic resins) or nylon. Other suitable durable and low friction plastic or other material may also be used. The first and second bearing washers 94 and 96 reduce the friction and wear of the components of the one-way turbine clutch 360.

Moreover, the retainer plate 277 of the turbine wheel 232 is configured to retain the engagement components 66 between the outer ring 262 and the inner ring 164, and to prevent axial movement of the first bearing washer 94, the inner ring 164 and the engagement components 66 of the one-way turbine clutch 360 relative to the outer ring 262 along the rotational axis X in the direction from right to left as shown in FIG. 22. Similarly, the guide plates $284_R$ of the driven member 284 of the torsional vibration damper 216 are configured to retain the engagement components 66 between the outer ring 262 and the inner ring 164, and to prevent axial movement of the second bearing washer 96, the inner ring 164 and the engagement components 66 of the one-way turbine clutch 360 relative to the outer ring 262 along the rotational axis X in the direction from left to right as shown in FIG. 22.

The foregoing description of the exemplary embodiments of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque converter for coupling a driving shaft and a driven shaft together, comprising:
   a casing rotatable about a rotational axis;
   an impeller wheel rotatable around the rotational axis;
   a turbine wheel rotatable around the rotational axis and disposed axially opposite to the impeller wheel, the turbine wheel coaxially aligned with and hydro-dynamically rotationally drivable by the impeller wheel;
   a stator situated axially between the impeller wheel and the turbine wheel;
   a one-way turbine clutch permitting rotational movement of the turbine wheel in one circumferential direction only; and
   a torsional vibration damper;
   the one-way turbine clutch including an outer ring non-rotatably coupled to the turbine wheel, an inner ring disposed radially within the outer ring, and a plurality of engagement components positioned radially between the outer and the inner rings and configured to permit rotational movement of the outer ring relative to the inner ring in one circumferential direction only;
   the torsional vibration damper comprising an input member rotatable about the rotational axis, a plurality of circumferentially acting elastic members, and an output member elastically coupled to the input member through the elastic members;
   the output member of the torsional vibration damper non-rotatably coupled to the outer ring of the one-way turbine clutch so that a radially inner end of the output member of the torsional vibration damper slidingly engages a radially outer guide surface of the inner ring of the one-way turbine clutch;
   the turbine wheel non-rotatably coupled to one of the outer ring of the one-way turbine clutch and the output member of the torsional vibration damper.

2. The hydrokinetic torque converter as defined in claim 1, further comprising a low-friction bearing washer disposed axially between the inner ring of the one-way turbine clutch and the output member of the torsional vibration damper so as to reduce friction therebetween when the outer ring of the one-way turbine clutch rotates relative to the inner ring thereof.

3. The hydrokinetic torque converter as defined in claim 1, further comprising an annular retainer plate extending radially and disposed between the stator and the turbine one-way clutch.

4. The hydrokinetic torque converter as defined in claim 3, wherein the annular retainer plate is separate from the turbine wheel and is non-moveably attached to the outer ring of the one-way turbine clutch.

5. The hydrokinetic torque converter as defined in claim 3, further comprising a low-friction bearing washer disposed axially between the retainer plate and the inner ring of the one-way turbine clutch so as to reduce friction therebetween when the turbine wheel rotates relative to the inner ring of the one-way turbine clutch.

6. The hydrokinetic torque converter as defined in claim 1, further comprising an annular retainer plate unitary with the turbine shell, the retainer plate extends radially inwardly from the turbine shell and is disposed between the stator and the one-way turbine clutch.

7. The hydrokinetic torque converter as defined in claim 1, further comprising a locking piston axially moveable to and from the casing so as to selectively frictionally engage the locking piston against the casing in a lock-up mode.

8. The hydrokinetic torque converter as defined in claim 7, wherein the locking piston is non-rotatably attached to the input member and axially moveable relative to the output member of the torsional vibration damper.

9. The hydrokinetic torque converter as defined in claim 7, wherein the casing has a locking surface, wherein the locking piston has an engagement surface axially facing the locking surface of the casing, and wherein the locking piston further includes an annular friction lining fixedly attached to the engagement surface of the locking piston.

10. The hydrokinetic torque converter as defined in claim 1, further comprising a one-way stator clutch mounted to the stator and permitting rotational movement of the stator in one circumferential direction only.

11. The hydrokinetic torque converter as defined in claim 1, wherein the inner ring of the one-way turbine clutch defines an output hub of the torque converter.

12. A hydrokinetic torque converter for coupling together a driving shaft and a driven shaft, comprising:
   a casing rotatable about a rotational axis;

an impeller wheel rotatable around the rotational axis;
a turbine wheel rotatable around the rotational axis and disposed axially opposite to the impeller wheel, the turbine wheel coaxially aligned with and hydro-dynamically rotationally drivable by the impeller wheel;
a stator situated axially between the impeller wheel and the turbine wheel;
a one-way turbine clutch permitting rotational movement of the turbine wheel in one circumferential direction only; and
a torsional vibration damper;
the one-way turbine clutch including an outer ring non-rotatably coupled to the turbine wheel, an inner ring disposed radially within the outer ring, and a plurality of engagement components positioned radially between the outer and the inner rings and configured to permit rotational movement of the outer ring relative to the inner ring in one circumferential direction only;
the torsional vibration damper comprising an input member rotatable about the rotational axis, a plurality of circumferentially acting elastic members, and an output member elastically coupled to the input member through the elastic members;
the output member of the torsional vibration damper non-rotatably coupled to the outer ring of the one-way turbine clutch;
the turbine wheel non-rotatably coupled to one of the outer ring of the one-way turbine clutch and the output member of the torsional vibration damper;
the turbine wheel including a coupling member extending substantially axially outwardly from the turbine shell in the direction toward the one-way turbine clutch and unitary with the turbine shell;
the coupling member of the turbine wheel non-rotatably coupled to the outer ring of the one-way turbine clutch.

13. The hydrokinetic torque converter as defined in claim 12, wherein the coupling member of the turbine wheel is non-moveably attached to a radially outer surface of the outer ring of the one-way turbine clutch.

14. A hydrokinetic torque converter for coupling together a driving shaft and a driven shaft together, comprising:
a casing rotatable about a rotational axis;
an impeller wheel rotatable around the rotational axis;
a turbine wheel rotatable around the rotational axis and disposed axially opposite to the impeller wheel, the turbine wheel coaxially aligned with and hydro-dynamically rotationally drivable by the impeller wheel;
a stator situated axially between the impeller wheel and the turbine wheel;
a one-way turbine clutch permitting rotational movement of the turbine wheel in one circumferential direction only; and
a torsional vibration damper;
the one-way turbine clutch including an outer ring non-rotatably coupled to the turbine wheel, an inner ring disposed radially within the outer ring, and a plurality of engagement components positioned radially between the outer and the inner rings and configured to permit rotational movement of the outer ring relative to the inner ring in one circumferential direction only;
the torsional vibration damper comprising an input member rotatable about the rotational axis, a plurality of circumferentially acting elastic members, and an output member elastically coupled to the input member through the elastic members;
the output member of the torsional vibration damper non-rotatably coupled to the outer ring of the one-way turbine clutch;
the turbine wheel non-rotatably coupled to one of the outer ring of the one-way turbine clutch and the output member of the torsional vibration damper;
the output member of the torsional vibration damper including at least one coupling member extending substantially axially outwardly from a radially inner end of the output member in the direction toward the turbine wheel, and at least one guide plate extending radially inwardly from the radially inner end of the output member;
the at least one coupling member and the at least one guide plate being unitary with the output member;
at least one coupling member non-rotatably coupled to the outer ring of the one-way turbine clutch.

15. The hydrokinetic torque converter as defined in claim 14, further comprising a plurality of turbine drive arms extending substantially axially toward the torsional vibration damper and non-moveably attached to the turbine wheel.

16. The hydrokinetic torque converter as defined in claim 15, wherein the output member of the torsional vibration damper further includes a plurality of driven fingers non-rotatably engaging the turbine drive arms of the turbine wheel.

17. The hydrokinetic torque converter as defined in claim 15, wherein the output member of the torsional vibration damper further includes a plurality of driven arms engaging ends of the elastic members of the torsional vibration damper.

18. A method for assembling a hydrokinetic torque converter, the method comprising the steps of:
providing first and second casing shells of a casing rotatable about a rotational axis;
providing a preassembled torque converter comprising an impeller wheel, a turbine wheel disposed axially opposite to the impeller wheel and a stator, the turbine wheel including a turbine shell;
providing a one-way turbine clutch permitting rotational movement of the turbine wheel in one circumferential direction only, the one-way turbine clutch including an outer ring, an inner ring disposed radially within the outer ring and a plurality of engagement components positioned radially between the outer and inner rings and configured to permitting rotational movement of the outer ring relative to the inner ring in one circumferential direction only;
providing a torsional vibration damper comprising an input member rotatable about the rotational axis, a plurality of circumferentially acting elastic members and an output member elastically coupled to the input member through the elastic members;
non-rotatably connecting the turbine wheel to one of the outer ring of the one-way turbine clutch coaxially with the rotational axis and the output member of the torsional vibration damper;
non-rotatably attaching the output member of the torsional vibration damper to the outer ring of the one-way turbine clutch so that a radially inner end of the output member of the torsional vibration damper slidingly engages a radially outer guide surface of the inner ring of the one-way turbine clutch; and elastically mounting the input member of the torsional vibration damper to the output member of the torsional vibration damper through the circumferentially acting elastic members.

19. The method as defined in claim 18, further comprising the steps of:

providing a locking piston; and non-rotatably attaching the locking piston to the input member of the torsional vibration damper.

\* \* \* \* \*